US012193090B2

(12) United States Patent
Asada

(10) Patent No.: US 12,193,090 B2
(45) Date of Patent: Jan. 7, 2025

(54) FIRST BASE STATION, SECOND BASE STATION, METHOD, PROGRAM, AND RECORDING MEDIUM

(71) Applicant: NEC Corporation, Tokyo (JP)

(72) Inventor: Shiro Asada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 372 days.

(21) Appl. No.: 17/626,583

(22) PCT Filed: Jul. 30, 2020

(86) PCT No.: PCT/JP2020/029230
§ 371 (c)(1),
(2) Date: Jan. 12, 2022

(87) PCT Pub. No.: WO2021/024904
PCT Pub. Date: Feb. 11, 2021

(65) Prior Publication Data
US 2022/0240332 A1    Jul. 28, 2022

(30) Foreign Application Priority Data
Aug. 8, 2019   (JP) .................................. 2019-146620

(51) Int. Cl.
*H04W 76/15* (2018.01)
*H04W 16/32* (2009.01)
*H04W 74/0833* (2024.01)

(52) U.S. Cl.
CPC .......... *H04W 76/15* (2018.02); *H04W 16/32* (2013.01); *H04W 74/0833* (2013.01)

(58) Field of Classification Search
CPC ............ H04W 76/15; H04W 28/0862; H04W 28/0864; H04W 28/0867; H04W 74/0833; H04W 16/32
See application file for complete search history.

(56) References Cited

U.S. PATENT DOCUMENTS

2017/0311200 A1* 10/2017 Koskinen ............... H04W 16/32
2018/0035436 A1*  2/2018 Sharma .................. H04W 16/14
(Continued)

FOREIGN PATENT DOCUMENTS

| WO | 2018/145063 A1 | 8/2018 |
| WO | 2019/031490 A1 | 2/2019 |
| WO | 2019/117109 A1 | 6/2019 |

OTHER PUBLICATIONS

Huawei, Intel Corporation; "Consideration of DL Data Delivery Status triggering" ; R3-173189 3GPP TSG-RAN WG3 #97 Berlin, Germany, Aug. 21-25, 2017 Agenda item: 10.8.3.1 (Year: 2017).*
Ericsson; "Enhancement on the Downlink Data Delivery Status"; R3-174767 3GPP TSG-RAN WG3 Meeting #98 Reno, USA, Nov. 27-Dec. 1, 2017 Agenda Item: 10.8.3.1 (Year: 2017).*
(Continued)

*Primary Examiner* — Gary Mui
(74) *Attorney, Agent, or Firm* — Sughrue Mion, PLLC

(57) ABSTRACT

In order to start transmission of downlink data to an RLC layer with an appropriate data amount from a base station that performs Packet Data Convergence Protocol (PDCP) layer processing to another base station that performs Radio Link Control (RLC) layer processing, a base station 100 (MN) includes: an information obtaining unit configured to obtain information for controlling a downlink data flow in a Radio Link Control (RLC) layer for a terminal apparatus 300; and a communication processing unit 143 configured to transmit, to a base station 200 (SN) performing processing for a PDCP layer for the terminal apparatus 300, the information for controlling the downlink data flow, before the base station 100 (MN) detects a correct random access channel access.

14 Claims, 16 Drawing Sheets

(56) References Cited

U.S. PATENT DOCUMENTS

| | | | |
|---|---|---|---|
| 2018/0227919 | A1 | 8/2018 | Lee et al. |
| 2018/0324644 | A1* | 11/2018 | Koskinen ............... H04L 47/34 |
| 2019/0069333 | A1* | 2/2019 | Kim ................. H04W 36/0033 |
| 2019/0141576 | A1* | 5/2019 | Hayashi ............... H04W 88/08 |
| 2019/0150224 | A1* | 5/2019 | Han ...................... H04W 72/23 370/329 |
| 2020/0163140 | A1 | 5/2020 | Mochizuki et al. |
| 2020/0228245 | A1* | 7/2020 | Shi ....................... H04W 80/08 |
| 2020/0296626 | A1* | 9/2020 | Deng ............... H04W 28/0864 |
| 2021/0168656 | A1* | 6/2021 | Li ......................... H04W 28/10 |
| 2021/0204281 | A1* | 7/2021 | Wu ....................... H04W 76/11 |
| 2021/0211939 | A1* | 7/2021 | Teyeb .................. H04W 40/24 |
| 2021/0314809 | A1* | 10/2021 | Teyeb .............. H04W 28/0278 |
| 2021/0377779 | A1* | 12/2021 | Itaba .................... H04W 28/10 |
| 2021/0385897 | A1* | 12/2021 | Purkayastha ....... H04W 36/305 |
| 2022/0086704 | A1* | 3/2022 | Futaki .................. H04W 36/36 |
| 2022/0123868 | A1* | 4/2022 | Han ..................... H04L 1/1642 |
| 2022/0182883 | A1* | 6/2022 | Jonsson ................. H04L 47/30 |

OTHER PUBLICATIONS

NTT Docomo, Inc.; "Clarification on desired buffer size"; R3-174903 3GPP TSG-RAN WG3 #98 Reno, NV, USA, Nov. 27-Dec. 1, 2017 Agenda Item: 10.8.3.1 (Year: 2017).*

Nokia, Nokia Shanghai Bell; "Downlink Data Delivery Status Reporting"; R3- 186709 3GPP TSG-RAN WG3 Meeting #102 Spokane, USA, Nov. 12-16, 2018 (Year: 2018).*

Ericsson; "Correction of Desired Buffer Size"; R3-190631 3GPP TSG RAN WG3 Meeting #103 Athens, Greece, Feb. 25-Mar. 1, 2019 Agenda Item: 9.3.18 (Year: 2019).*

International Search Report for PCT Application No. PCT/JP2020/029230, mailed on Oct. 20, 2020.

English translation of Written opinion for PCT Application No. PCT/JP2020/029230, mailed on Oct. 20, 2020.

3GPP TS 38.425 V15.5.0, "NG-RAN;NR user plane protocol". Mar. 2019, pp. 1-22.

3GPP TS 37.340 V15.6.0, "Evolved Universal Terrestrial Radio Access (E-UTRA) and NR;Multi-connectivity". Jun. 2019, pp. 1-69.

* cited by examiner

FIRST BASE STATION, SECOND BASE STATION, METHOD, PROGRAM, AND RECORDING MEDIUM

BACKGROUND

Technical Field

The present invention relates to a first base station, a second base station, a method, a program, and a recording medium.

Background Art

NPL 1 discloses dual connectivity, in which packet data is transmitted and received between one user terminal (hereinafter referred to as a User Equipment or a UE) and two base stations.

In dual connectivity, a Split Bearer, in which transmission and reception of data between one Packet Data Convergence Protocol (PDCP) layer and two Radio Link Control (RLC) layers is performed, is defined.

In the PDCP layer, downlink data is appropriately transmitted to RLC layer processing units respectively included in two different nodes in a radio communication network, and thus information for controlling a downlink data flow such as a receivable buffer size or a receivable data rate of the RLC layer processing units needs to be taken into consideration. When such is not taken into consideration, this can lead to service deterioration due to discarding of a buffer or low-rate transmission in the RLC layer processing units.

In view of this, NPL 1 discloses a configuration of including the above-described receivable buffer size ("Desired buffer size for the data radio bearer: 4 OCTETs" described in NPL 1) or receivable data rate ("Desired Data Rate: 4 OCTETs" described in NPL 1) in a DL Data Delivery Status transmitted from the RLC layer to the PDCP layer.

NPL 2 discloses that when a terminal apparatus enters a cell area of a secondary node under an environment of a Master Node (MN) Terminated Master Cell Group (MCG) Bearer, for example, dual connectivity communication between the master node and the secondary node is available.

CITATION LIST

Non Patent Literature

[NPL 1] 3GPP TS 38.425 V15.5.0 (2019 March)
[NPL 2] 3GPP TS 37.340 V15.6.0 (2019 June)

SUMMARY

Technical Problem

However, in the techniques disclosed in NPLs 1 and 2 described above, for example, when reconfiguration related to the secondary node, such as Addition of the secondary node, is performed, transmission of downlink data to the RLC layer cannot be started with an appropriate data amount from a base station that performs PDCP layer processing to another base station that performs RLC layer processing.

The example object of the present invention is to provide a first base station, a second base station, a method, a program, and a recording medium that can start transmission of downlink data to the RLC layer with an appropriate data amount from a base station that performs PDCP layer processing to another base station that performs RLC layer processing.

Solution to Problem

According to one aspect of the present invention, a first base station includes: an information obtaining unit configured to obtain information for controlling a downlink data flow in a Radio Link Control (RLC) layer for a terminal apparatus; and a communication processing unit configured to transmit, to a second base station performing processing for a Packet Data Convergence Protocol (PDCP) layer for the terminal apparatus, the information for controlling the downlink data flow, before the first base station detects a correct random access channel access.

According to one aspect of the present invention, a second base station includes: an execution unit configured to execute processing for a Packet Data Convergence Protocol (PDCP) layer; and a communication processing unit configured to receive, from a first base station performing processing in a Radio Link Control (RLC) layer for the terminal apparatus, information for controlling a downlink data flow in the RLC layer, before the first base station detects a correct random access channel access.

According to one aspect of the present invention, a method includes: obtaining information for controlling a downlink data flow in a Radio Link Control (RLC) layer for a terminal apparatus; and transmitting the information for controlling the downlink data flow to a second base station performing processing for a Packet Data Convergence Protocol (PDCP) layer for the terminal apparatus, before the first base station detects a correct random access channel access.

According to one aspect of the present invention, a method includes: executing processing for a Packet Data Convergence Protocol (PDCP) layer; and receiving, from a first base station performing processing in a Radio Link Control (RLC) layer for the terminal apparatus, information for controlling a downlink data flow in the RLC, before the first base station detects a correct random access channel access.

According to one aspect of the present invention, a program causes a processor to execute: obtaining information for controlling a downlink data flow in a Radio Link Control (RLC) layer for a terminal apparatus; and transmitting the information for controlling the downlink data flow to a second base station performing processing for a Packet Data Convergence Protocol (PDCP) layer for the terminal apparatus, before the first base station detects a correct random access channel access.

According to one aspect of the present invention, a program causes a processor to execute: executing processing for a Packet Data Convergence Protocol (PDCP) layer; and receiving, from a first base station performing processing in a Radio Link Control (RLC) layer for the terminal apparatus, information for controlling a downlink data flow in the RLC, before the first base station detects a correct random access channel access.

According to one aspect of the present invention, a recording medium is a non-transitory computer readable recording medium storing a program that causes a processor to execute: obtaining information for controlling a downlink data flow in a Radio Link Control (RLC) layer for a terminal apparatus; and transmitting the information for controlling the downlink data flow to a second base station performing processing for a Packet Data Convergence Protocol (PDCP)

layer for the terminal apparatus, before the first base station detects a correct random access channel access.

According to one aspect of the present invention, a recording medium is a non-transitory computer readable recording medium storing a program that causes a processor to execute: executing processing for a Packet Data Convergence Protocol (PDCP) layer; and receiving, from a first base station performing processing in a Radio Link Control (RLC) layer for the terminal apparatus, information for controlling a downlink data flow in the RLC, before the first base station detects a correct random access channel access.

Advantageous Effects of Invention

According to the present invention, transmission of downlink data can be started with an appropriate data amount from a base station that performs PDCP layer processing to another base station that performs RLC layer processing. Note that, according to the present invention, instead of or together with the above effects, other effects may be exerted.

DESCRIPTION OF THE EXAMPLE EMBODIMENTS

Figure 1:
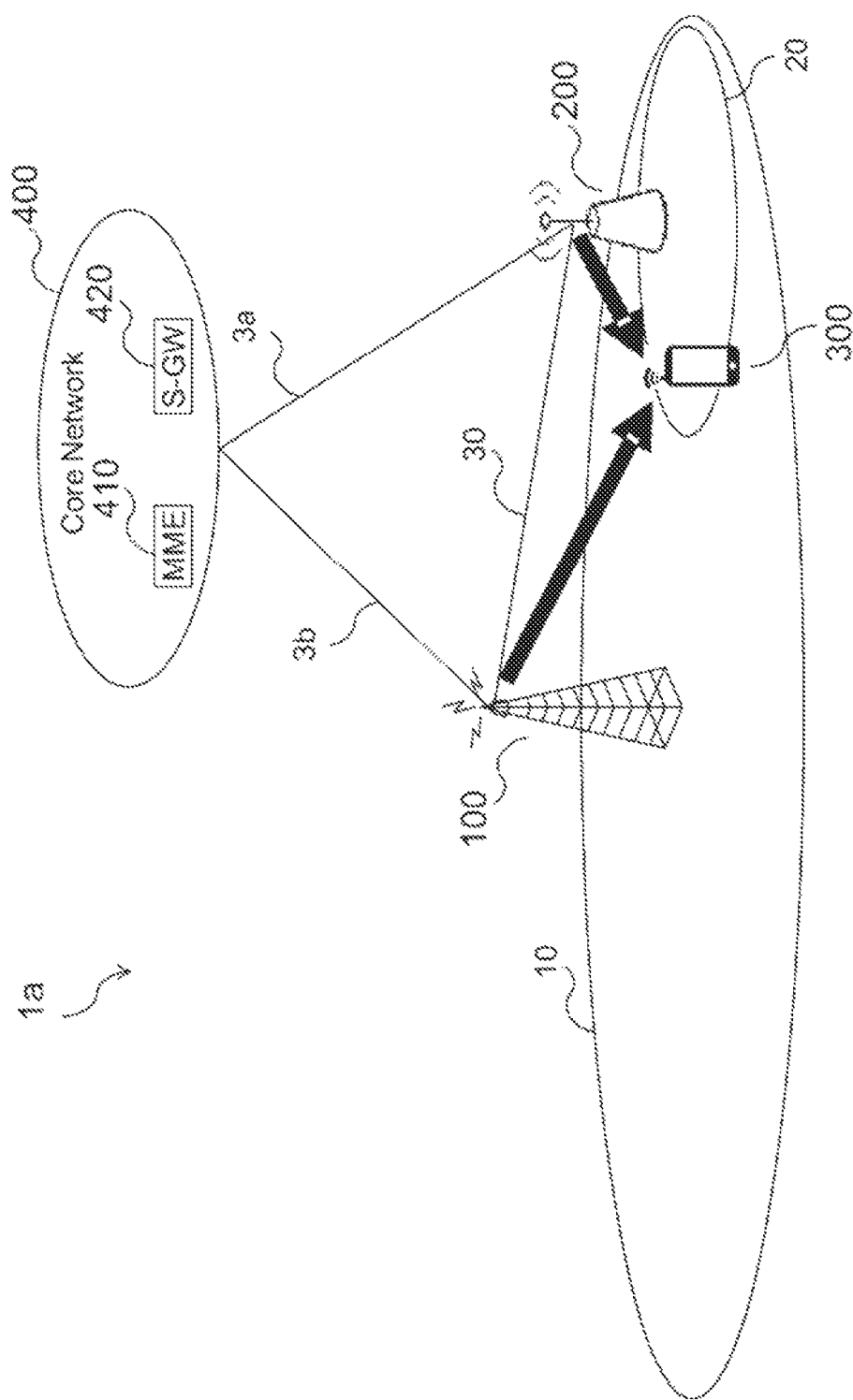
FIG. 1 is an explanatory diagram illustrating an example of a schematic configuration of a system 1a according to an example embodiment of the present invention.

Hereinafter, example embodiments of the present invention will be described in detail with reference to the accompanying drawings. Note that, in the Specification and drawings, elements to which similar descriptions are applicable are denoted by the same reference signs, and overlapping descriptions may hence be omitted.

Descriptions will be given in the following order.
1. Overview of Example Embodiment of Present Invention
2. First Example Embodiment
    2.1. Configuration of System 1a according to First Example Embodiment
    2.2. Configuration of Base Station 100
    2.3. Configuration of Base Station 200
    2.4. Technical Features
    2.5. Example Alterations
3. Second Example Embodiment
    3.1. Configuration of System 2
    3.2. Configuration of First Base Station 500
    3.3. Configuration of Second Base Station 600
    3.4. Technical Features
4. Other Example Embodiments 1. Overview of Example Embodiment of Present Invention First, an overview of example embodiments of the present invention will be described.
(1) Technical Issues
NPL 1 discloses dual connectivity, in which packet data is transmitted and received between one user terminal (hereinafter referred to as a User Equipment or a UE) and two base stations.

In dual connectivity, a Split Bearer, in which transmission and reception of data between one Packet Data Convergence Protocol (PDCP) layer and two Radio Link Control (RLC) layers is performed, is defined.

In the PDCP layer, downlink data is appropriately transmitted to RLC layer processing units respectively included in two different nodes in a radio communication network, and thus information for controlling a downlink data flow such as a receivable buffer size or a receivable data rate of the RLC layer processing units needs to be taken into consideration. When such is not taken into consideration, this can lead to service deterioration due to discarding of a buffer or low-rate transmission in the RLC layer processing units.

In view of this, NPL 1 discloses a configuration of including the above-described receivable buffer size ("Desired buffer size for the data radio bearer: 4 OCTETs" described in NPL 1) or receivable data rate ("Desired Data Rate: 4 OCTETs" described in NPL 1) in a DL Data Delivery Status transmitted from the RLC layer to the PDCP layer.

NPL 2 discloses that when a terminal apparatus enters a cell area of a secondary node under an environment of a Master Node (MN) Terminated Master Cell Group (MCG)

Bearer, for example, dual connectivity communication between the master node and the secondary node is available.

However, in the techniques disclosed in NPLs 1 and 2 described above, for example, when reconfiguration related to the secondary node, such as Addition of the secondary node, is performed, transmission of downlink data to the RLC layer cannot be started with an appropriate data amount from a base station that performs PDCP layer processing to another base station that performs RLC layer processing.

Specifically, there is a problem that information of the receivable buffer size (Desired buffer size for the data radio bearer) or the receivable data rate (Desired Data Rate) on the RLC layer side is not included in a message of SgNB Reconfiguration Complete in a sequence for constructing dual connectivity configuration of Secondary Node (SN) Terminated Split Bearer Option as disclosed in NPL 2 described above, and thus the PDCP layer processing unit included in the SgNB cannot transmit downlink data with an optimal data amount until receiving the DL Data Delivery Status.

In view of this, the example object according to one aspect of the present disclosure is to start transmission of downlink data to the RLC layer with an appropriate data amount from a base station that performs PDCP layer processing to another base station that performs RLC layer processing.

(2) Technical Features

According to one aspect of the present invention, for example, a first base station is configured to obtain information for controlling a downlink data flow in a Radio Link Control (RLC) layer for a terminal apparatus, and is configured to transmit, to a second base station performing processing for a Packet Data Convergence Protocol (PDCP) layer for the terminal apparatus, the information for controlling the downlink data flow, before the first base station detects a correct random access channel access.

With this configuration, for example, transmission of downlink data can be started with an appropriate data amount from a base station that performs PDCP layer processing to another base station that performs RLC layer processing.

Note that the above-described technical features are concrete examples of the example embodiments of the present invention, and the example embodiments of the present invention are, of course, not limited to the above-described technical features.

2. First Example Embodiment

Next, with reference to FIG. 1 to FIG. 13, the first example embodiment will be described.

<2.1. Configuration of System 1a According to First Example Embodiment>

With reference to FIG. 1, an example of a configuration of a system 1a according to the first example embodiment will be described. FIG. 1 is an explanatory diagram illustrating an example of a schematic configuration of the system 1a according to an example embodiment of the present invention. With reference to FIG. 1, the system 1a includes base stations 100 and 200, a terminal apparatus 300, a core network 400, an X2 interface 30, and S1 interfaces 3a and 3b. For example, the base stations 100 and 200 perform communication with each other via the X2 interface 30. The base station 100 performs communication with the core network 400 via the S1 interface 3a. The base station 200 performs communication with the core network 400 via the S1 interface 3b.

The system 1a is, for example, a system conforming to Third Generation Partnership Project (3GPP) standards/specifications. More specifically, for example, the system 1 may be a system conforming to LTE/LTE-Advanced and/or System Architecture Evolution (SAE) standards/specifications. Alternatively, the system 1 may be a system conforming to fifth-generation (5G)/New Radio (NR) standards/specifications. The system 1 is, of course, not limited to these examples.

(1) Base Station 100

The base station 100 is a node of a Radio Access Network (RAN), and performs radio communication with a terminal apparatus (for example, the terminal apparatus 300) located in a coverage area 10. For example, the base station 100 may function as a master node of dual connectivity for the terminal apparatus 300.

For example, the base station 100 may be an evolved Node B (eNB), or a generation Node B (gNB) in 5G. The base station 100 may include a plurality of units (or a plurality of nodes). The plurality of units (or the plurality of nodes) may include a first unit (or a first node) configured to perform higher protocol layer processing and a second unit (or a second node) configured to perform lower protocol layer processing. As an example, the first unit may be referred to as a center/central unit (CU), and the second unit may be referred to as a distributed unit (DU) or an access unit (AU). As another example, the first unit may be referred to as a digital unit (DU), and the second unit may be referred to as a radio unit (RU) or a remote unit (RU). The digital unit (DU) may be a base band unit (BBU), and the RU may be a remote radio head (RRH) or a remote radio unit (RRU). The terms for the first unit (or the first node) and the second unit (or the second node) are, of course, not limited to these examples. Alternatively, the base station 100 may be a single unit (or a single node). In this case, the base station 100 may be one of the plurality of units (e.g., either one of the first unit and the second unit) or may be connected to another unit of the plurality of units (e.g., the other one of the first unit and the second unit).

(2) Base Station 200

The base station 200 is a node of a Radio Access Network (RAN), and performs radio communication with a terminal apparatus (for example, the terminal apparatus 300) located in a coverage area 20. For example, the base station 200 may function as a secondary node of dual connectivity for the terminal apparatus 300.

For example, the base station 200 may be an evolved Node B (eNB), or a generation Node B (gNB) in 5G. The base station 200 may include a plurality of units (or a plurality of nodes). The plurality of units (or the plurality of nodes) may include a first unit (or a first node) configured to perform higher protocol layer processing and a second unit (or a second node) configured to perform lower protocol layer processing. As an example, the first unit may be referred to as a center/central unit (CU), and the second unit may be referred to as a distributed unit (DU) or an access unit (AU). As another example, the first unit may be referred to as a digital unit (DU), and the second unit may be referred to as a radio unit (RU) or a remote unit (RU). The digital unit (DU) may be a base band unit (BBU), and the RU may be a remote radio head (RRH) or a remote radio unit (RRU). The terms for the first unit (or the first node) and the second unit (or the second node) are, of course, not limited to these examples. Alternatively, the base station 200 may be a single unit (or a single node). In this case, the base station 200 may be one of the plurality of units (e.g., either one of the first unit and the second unit) or may be connected to another unit of the plurality of units (e.g., the other one of the first unit and the second unit).

(3) Terminal Apparatus 300

The terminal apparatus 300 performs radio communication with the base station. For example, the terminal apparatus 300 performs radio communication with the base station 100 when the terminal apparatus 300 is located in the coverage area 10 of the base station 100, and performs radio communication with the base station 200 when the terminal apparatus 300 is located in the coverage area 20 of the base station 200. For example, the terminal apparatus 300 is a User Equipment (UE).

(4) Core Network 400

The core network 400 includes a Mobility Management Entity (MME) 410, a Serving Gateway (S-GW) 420, and the like that perform control related to the base station 100 and the base station 200.

<2.2. Configuration of Base Station 100>

Figure 2:
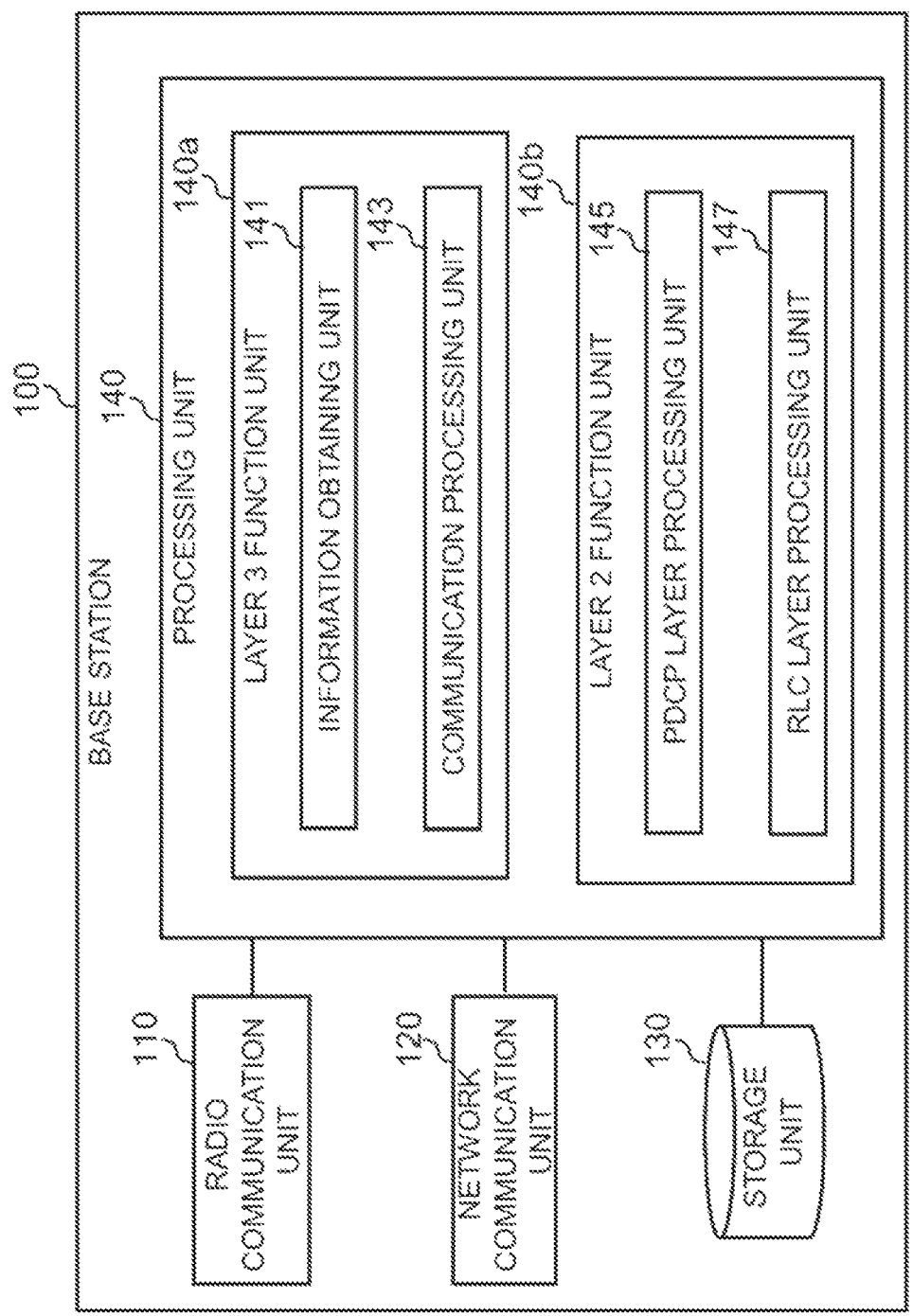
FIG. 2 is a block diagram illustrating an example of a schematic configuration of a base station 100 according to a first example embodiment.

Next, with reference to FIG. 2, an example of a configuration of the base station 100 according to the first example embodiment will be described. FIG. 2 is a block diagram illustrating an example of a schematic configuration of the base station 100 according to the first example embodiment. With reference to FIG. 2, the base station 100 includes a radio communication unit 110, a network communication unit 120, a storage unit 130, and a processing unit 140.

(1) Radio Communication Unit 110

The radio communication unit 110 wirelessly transmits and receives a signal. For example, the radio communication unit 110 receives a signal from the terminal apparatus, and transmits a signal to the terminal apparatus. The radio communication unit 110 is, for example, a Radio Unit (RU) that performs processing for the physical layer.

(2) Network Communication Unit 120

The network communication unit 120 receives a signal from a network, and transmits a signal to a network.

(3) Storage Unit 130

The storage unit 130 temporarily or permanently stores programs (instructions) and parameters for operations of the base station 100 as well as various data. The program includes one or more instructions for operations of the base station 100.

(4) Processing Unit 140

The processing unit 140 provides various functions of the base station 100. The processing unit 140 is a Lower-Layer Split—Central Unit (LLS-CU) that performs processing for a layer higher than the physical layer. Specifically, the processing unit 140 includes a layer 3 function unit 140*a* and a layer 2 function unit 140*b*. The layer 3 function unit 140*a* is, for example, a function unit that performs processing of the Radio Resource Control (RRC) and the X2-Application (AP) protocol, and includes an information obtaining unit 141 and a communication processing unit 143. The layer 3 function unit 140*a* is a function unit that performs processing in the Packet Data Convergence Protocol (PDCP) layer and the Radio Link Control (RLC) layer, and includes a PDCP layer processing unit 145 and an RLC layer processing unit 147. Note that the processing unit 140 may further include another constituent element (for example, a Medium Access Control (MAC) layer processing unit or the like) other than these constituent elements. In other words, the processing unit 140 may also perform operations other than the operations of these constituent elements. Specific operations of the information obtaining unit 141, the communication processing unit 143, the PDCP layer processing unit 145, and the RLC layer processing unit 147 will be described later in detail.

(5) Implementation Example

The radio communication unit 110 may be implemented with an antenna, a radio frequency (RF) circuit, and the like, and the antenna may be a directional antenna. The network communication unit 120 may be implemented with a network adapter and/or a network interface card, and the like. The storage unit 130 may be implemented with a memory (e.g., a nonvolatile memory and/or a volatile memory) and/or a hard disk, and the like. The processing unit 140 may be implemented with one or more processors, such as a baseband (BB) processor and/or a different kind of processor. The information obtaining unit 141, the communication processing unit 143, the PDCP layer processing unit 145, and the RLC layer processing unit 147 may be implemented with the same processor, or may be implemented with different processors separately. The memory (storage unit 130) may be included in the one or more processors or may be provided outside the one or more processors.

The base station 100 may include a memory configured to store a program (instructions) and one or more processors that can execute the program (instructions). The one or more processors may execute the program, and perform operations of the processing unit 140 (operations of the information obtaining unit 141, the communication processing unit 143, the PDCP layer processing unit 145, and/or the RLC layer processing unit 147). The program may be a program for causing the processor(s) to execute the operations of the processing unit 140 (operations of the information obtaining unit 141, the communication processing unit 143, the PDCP layer processing unit 145, and/or the RLC layer processing unit 147).

Note that the base station 100 may be virtual. In other words, the base station 100 may be implemented as a virtual machine. In this case, the base station 100 (the virtual machine) may operate as a physical machine (hardware) including a processor, a memory, and the like, and a virtual machine on a hypervisor.

<2.3. Configuration of Base Station 200>

Figure 3:
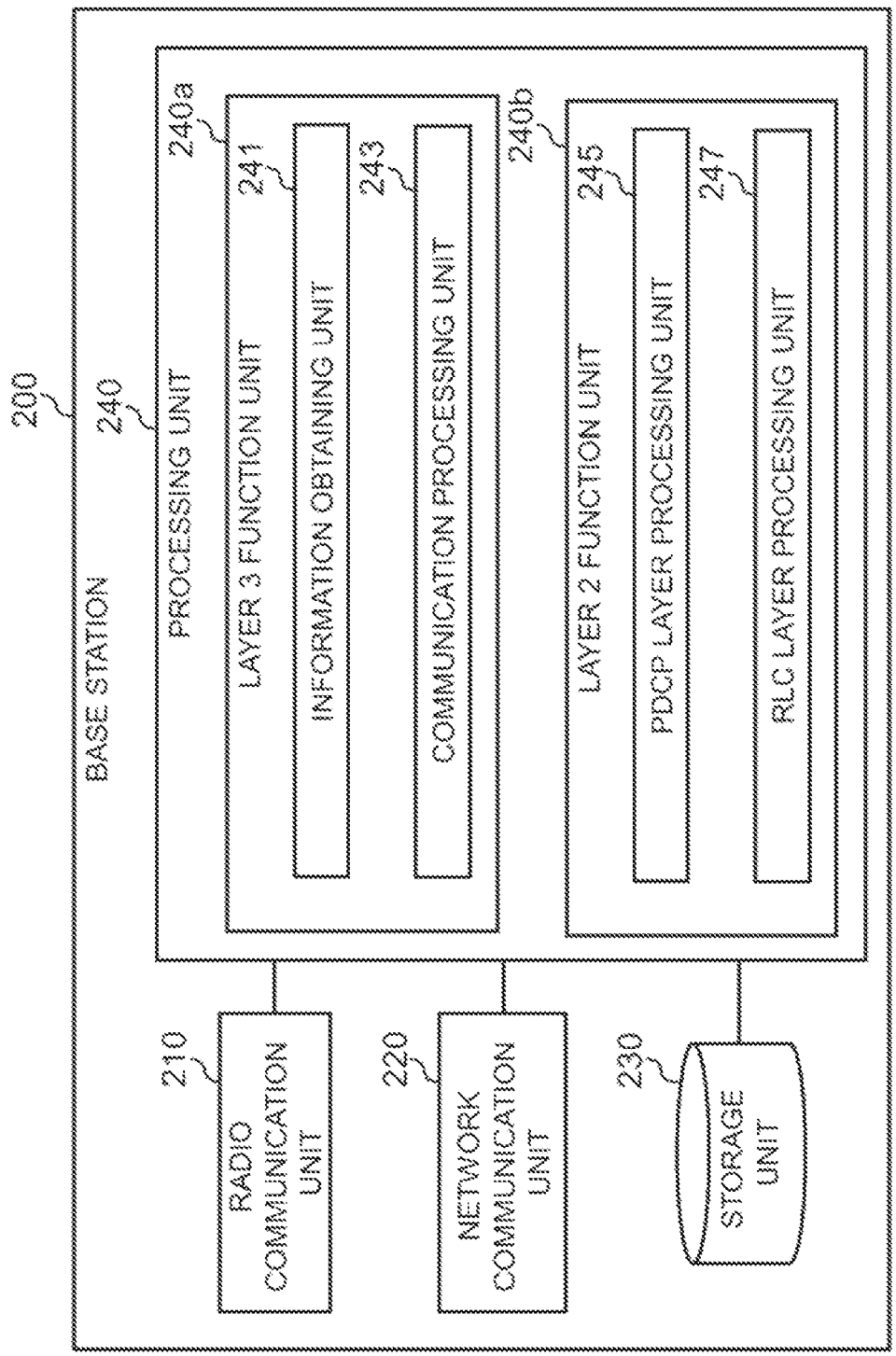
FIG. 3 is a block diagram illustrating an example of a schematic configuration of a base station 200 according to the first example embodiment.

Next, with reference to FIG. 3, an example of a configuration of the base station 200 according to the first example embodiment will be described. FIG. 3 is a block diagram illustrating an example of a schematic configuration of the base station 200 according to the first example embodiment. With reference to FIG. 3, the base station 200 includes a radio communication unit 210, a network communication unit 220, a storage unit 230, and a processing unit 240.

(1) Radio Communication Unit 210

The radio communication unit 210 wirelessly transmits and receives a signal. For example, the radio communication unit 210 receives a signal from the terminal apparatus, and transmits a signal to the terminal apparatus. The radio communication unit 210 is, for example, a radio unit that performs processing for the physical layer.

(2) Network Communication Unit 220

The network communication unit 220 receives a signal from a network, and transmits a signal to a network.

(3) Storage Unit 230

The storage unit 230 temporarily or permanently stores programs (instructions) and parameters for operations of the base station 200 as well as various data. The program includes one or more instructions for operations of the base station 200.

(4) Processing Unit 240

The processing unit 240 provides various functions of the base station 200. The processing unit 240 is a Lower-Layer Split—Central Unit (LLS-CU) that performs processing for a layer higher than the physical layer. Specifically, the processing unit 240 includes a layer 3 function unit 240a and a layer 2 function unit 240b. The layer 3 function unit 240a is, for example, a function unit that performs processing of the RRC and the X2-AP protocol, and includes an information obtaining unit 241 and a communication processing unit 243. The layer 3 function unit 240a is a function unit that performs processing in the PDCP layer and the RLC layer, and includes a PDCP layer processing unit 245 and an RLC layer processing unit 247. Note that the processing unit 240 may further include another constituent element (for example, a MAC layer processing unit or the like) other than these constituent elements. In other words, the processing unit 240 may also perform operations other than the operations of these constituent elements. Specific operations of the information obtaining unit 241, the communication processing unit 243, the PDCP layer processing unit 245, and the RLC layer processing unit 247 will be described later in detail.

(5) Implementation Example

The radio communication unit 210 may be implemented with an antenna, a radio frequency (RF) circuit, and the like, and the antenna may be a directional antenna. The network communication unit 220 may be implemented with a network adapter and/or a network interface card, and the like. The storage unit 230 may be implemented with a memory (e.g., a nonvolatile memory and/or a volatile memory) and/or a hard disk, and the like. The processing unit 240 may be implemented with one or more processors, such as a baseband (BB) processor and/or a different kind of processor. The information obtaining unit 241, the communication processing unit 243, the PDCP layer processing unit 245, and the RLC layer processing unit 247 may be implemented with the same processor, or may be implemented with different processors separately. The memory (storage unit 230) may be included in the one or more processors or may be provided outside the one or more processors.

The base station 200 may include a memory configured to store a program (instructions) and one or more processors that can execute the program (instructions). The one or more processors may execute the program, and perform operations of the processing unit 240 (operations of the information obtaining unit 241, the communication processing unit 243, the PDCP layer processing unit 245, and/or the RLC layer processing unit 247). The program may be a program for causing the processor(s) to execute the operations of the processing unit 240 (operations of the information obtaining unit 241, the communication processing unit 243, the PDCP layer processing unit 245, and/or the RLC layer processing unit 247).

Note that the base station 200 may be virtual. In other words, the base station 200 may be implemented as a virtual machine. In this case, the base station 200 (the virtual machine) may operate as a physical machine (hardware) including a processor, a memory, and the like, and a virtual machine on a hypervisor.

<2.4. Technical Features>

With reference to FIG. 4 to FIG. 8, technical features of the first example embodiment will be described.

According to the first example embodiment, a first base station (for example, the information obtaining unit 141 of the base station 100) obtains information for controlling a downlink data flow in an RLC layer for a terminal apparatus (for example, the terminal apparatus 300). The first base station (for example, the communication processing unit 143 of the base station 100) transmits, to a second base station (for example, the base station 200) performing processing for a PDCP layer for the terminal apparatus (for example, the terminal apparatus 300), the information for controlling the downlink data flow, before the first base station (for example, the base station 100) detects a correct random access channel access between the terminal apparatus (for example, the terminal apparatus 300) and the second base station (for example, the base station 200).

Specifically, the random access channel access is carried out by the terminal apparatus (for example, the terminal apparatus 300) for a bearer for the second base station (for example, the base station 200). Here, the bearer for the second base station (for example, the base station 200) is a bearer that requires radio resources of a group of serving cells (for example, a secondary cell group) associated with the second base station (for example, the base station 200).

The second base station (for example, the PDCP layer processing unit 245 of the base station 200) executes processing for the PDCP layer. The second base station (communication processing unit 243 of the base station 200) receives the information for controlling the downlink data flow in the RLC from the first base station (for example, the base station 100) performing processing in the RLC layer for the terminal apparatus (for example, the terminal apparatus 300), before the first base station (for example, the base station 100) detects a correct random access channel access between the terminal apparatus (for example, the terminal apparatus 300) and the second base station (for example, the base station 200).

The first base station does not necessarily correspond to the base station 100, and for example, the first base station may be the base station 200. In this case, the second base station may correspond to, for example, the base station 100.

(1) Information for Controlling Downlink Data Flow

For example, the information for controlling the downlink data flow may include information related to a buffer size for downlink data in the RLC layer. The information for controlling the downlink data flow may include information related to a data rate for the downlink data in the RLC layer.

Specifically, the information for controlling the downlink data flow may be a DL Data Delivery Status defined in NPL 1 described above. In this case, the buffer size for the downlink data in the RLC layer may correspond to a "Desired buffer size for the data radio bearer" defined in NPL 1. The data rate for the downlink data in the RLC layer may correspond to a "Desired Data Rate" defined in NPL 1.

(2) Transmission Timing for Information for Controlling Downlink Data Flow

The timing is a timing of transmitting the information for controlling the downlink data flow to the second base station (for example, the base station 200) before the first base station (for example, the base station 100) detects a correct random access channel access by the terminal apparatus (for example, the terminal apparatus 300).

(3) Specific Examples (3-1) First Specific Example

In a first specific example, the first base station is a master node (for example, the base station 100) for dual connectivity for the terminal apparatus 300, and the second base station is a secondary node (for example, the base station 200) for dual connectivity for the terminal apparatus 300.

Figure 4:
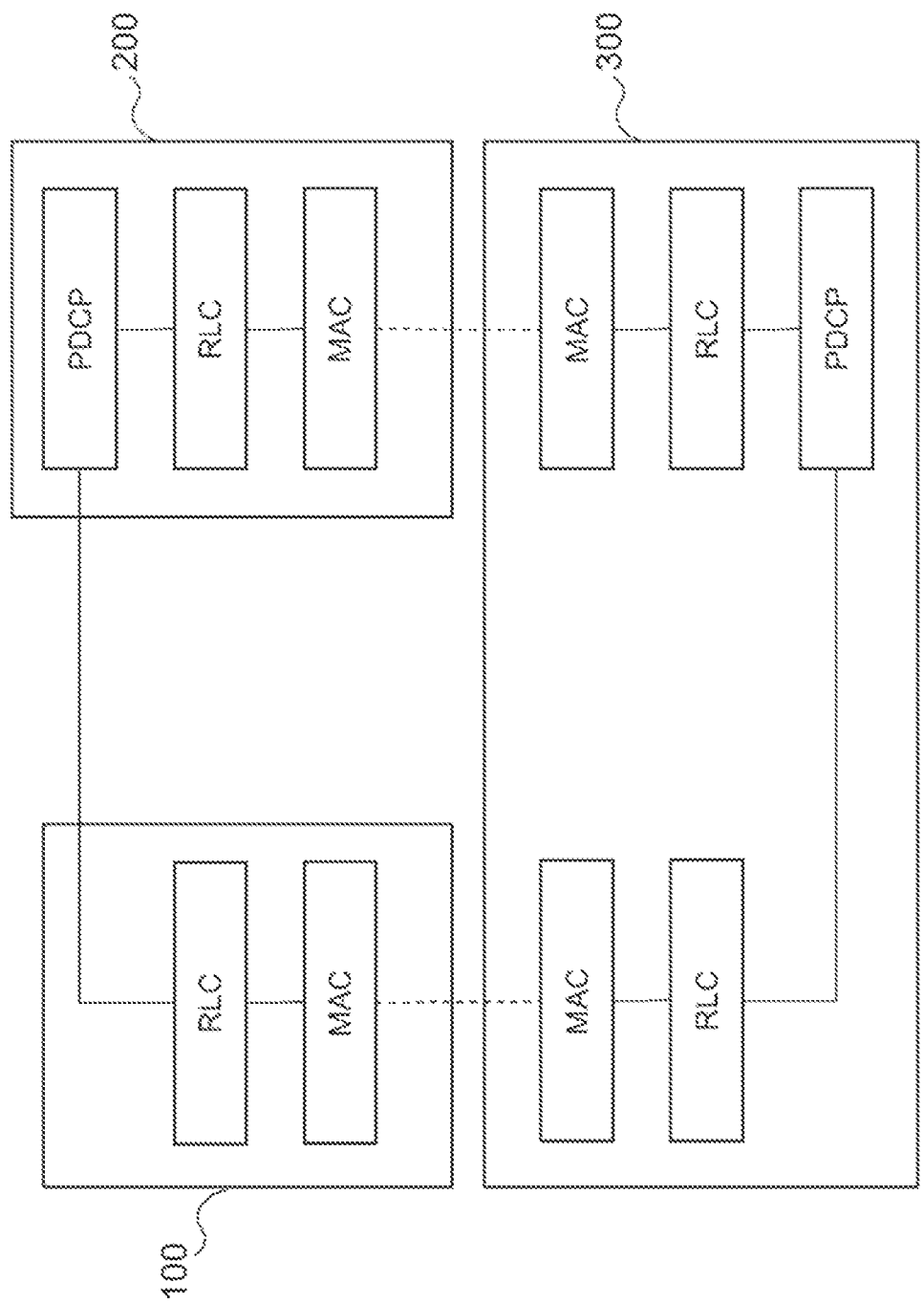
FIG. 4 is a diagram illustrating a schematic configuration of a downlink data flow in an SN Terminated Split Bearer.

In the first specific example, a Secondary Node (SN) Terminated Split Bearer for dual connectivity is configured. FIG. 4 is a diagram illustrating a schematic configuration of a downlink data flow in the SN Terminated Split Bearer.

As illustrated in FIG. 4, in the SN Terminated Split Bearer for dual connectivity, the terminal apparatus 300 performs communication simultaneously with the master node (base station 100) and the secondary node (base station 200). Specifically, the secondary node (for example, the PDCP layer processing unit 245 of the base station 200) performs PDCP layer processing, and distributes downlink data to the master node (RLC layer processing unit 147 of the base station 100) and the secondary node (RLC layer processing unit 147 of the base station 200).

The secondary node (PDCP layer processing unit 245 of the base station 200) receives a DL Data Delivery Status message from the master node (communication processing unit 143 of the base station 100), and can thereby check a load state of the RLC layer processing unit on the master node side (RLC layer processing unit 147 of the base station 100). In other words, the secondary node (PDCP layer processing unit 245 of the base station 200) can refer to a DL Data Delivery Status message from the master node (base station 100), to adjust a data amount to be distributed to each of the master node (RLC layer processing unit 147 of the base station 100) and the secondary node (RLC layer processing unit 247 of the base station 200).

Transmission Timing of DL Data Delivery Status Message

In the first specific example, the master node (communication processing unit 143 of the base station 100) transmits a secondary node reconfiguration complete message to the secondary node (base station 200) during a secondary node addition procedure for the terminal apparatus 300. Here, the information for controlling the downlink data flow is included in the secondary node reconfiguration complete message.

The secondary node addition procedure for the terminal apparatus 300 may correspond to, for example, an SgNB Addition Procedure for dual connectivity of SN Terminated Split Bearer Option of a Low Layer Split (LLS) configuration.

Figure 5:
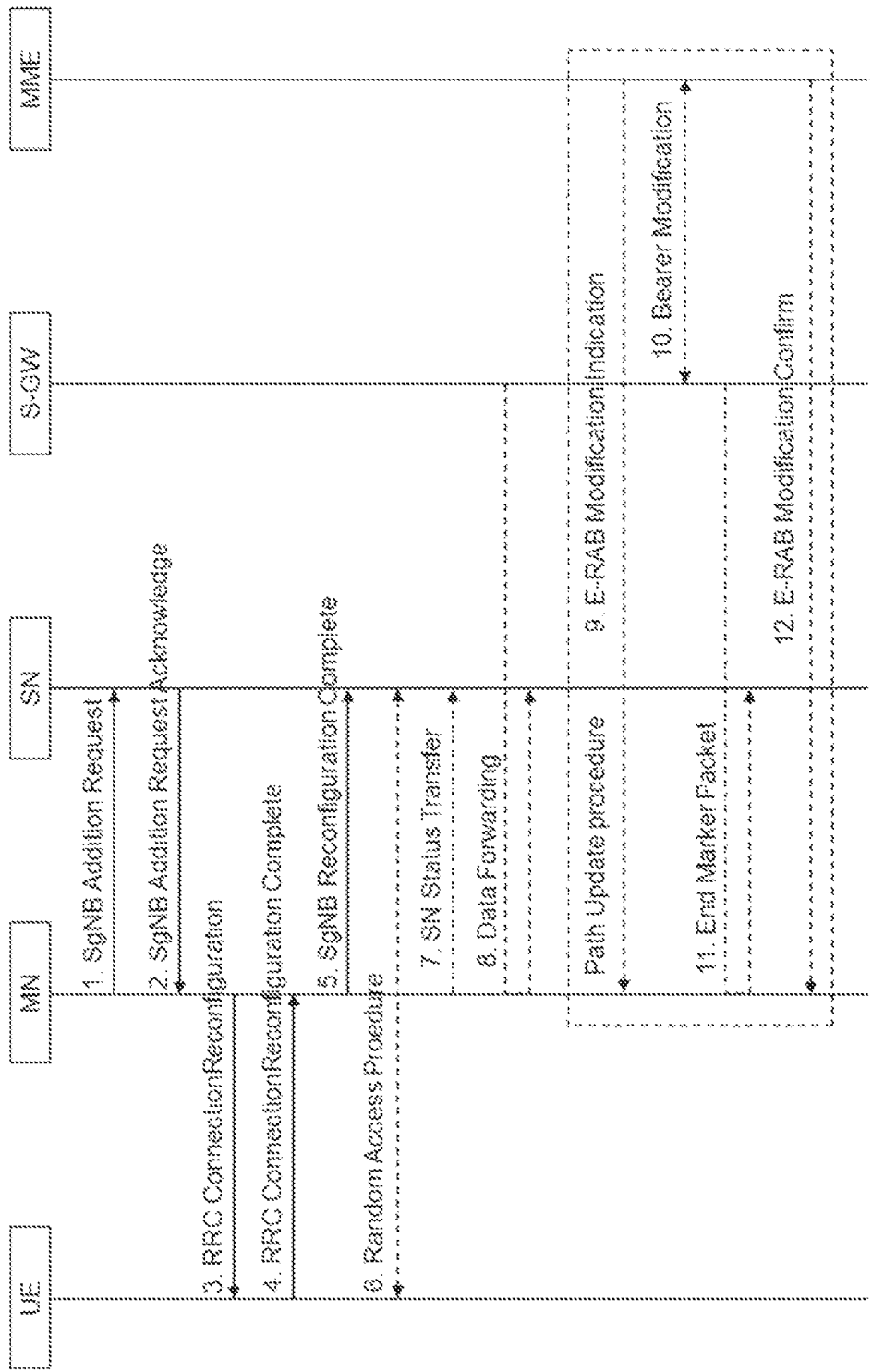
FIG. 5 is a sequence diagram illustrating an example of processing of an SgNB Addition Procedure in an LLS configuration.

FIG. 5 is a sequence diagram illustrating an example of processing of the SgNB Addition Procedure in the LLS configuration. With reference to FIG. 5, the "UE" corresponds to the terminal apparatus 300, the "MN" corresponds to the base station 100, the "SN" corresponds to the base station 200, and the "S-GW" and "MME" each correspond to a network node in the core network 400. In the sequence as illustrated in FIG. 5, the secondary node reconfiguration complete message corresponds to a message of SgNB Reconfiguration Complete. The random access channel access is carried out in the Random Access Procedure that is performed after SgNB Reconfiguration Complete.

For example, as a reference example, in the technique described in NPL 1 or the like, after the secondary node receives the message of SgNB Reconfiguration Complete, a PDCP processing unit in the secondary node transmits DL user Data for polling to the master node MN in order to receive a DL Data Delivery Status, and can thereby receive the DL Data Delivery Status.

Figure 6:
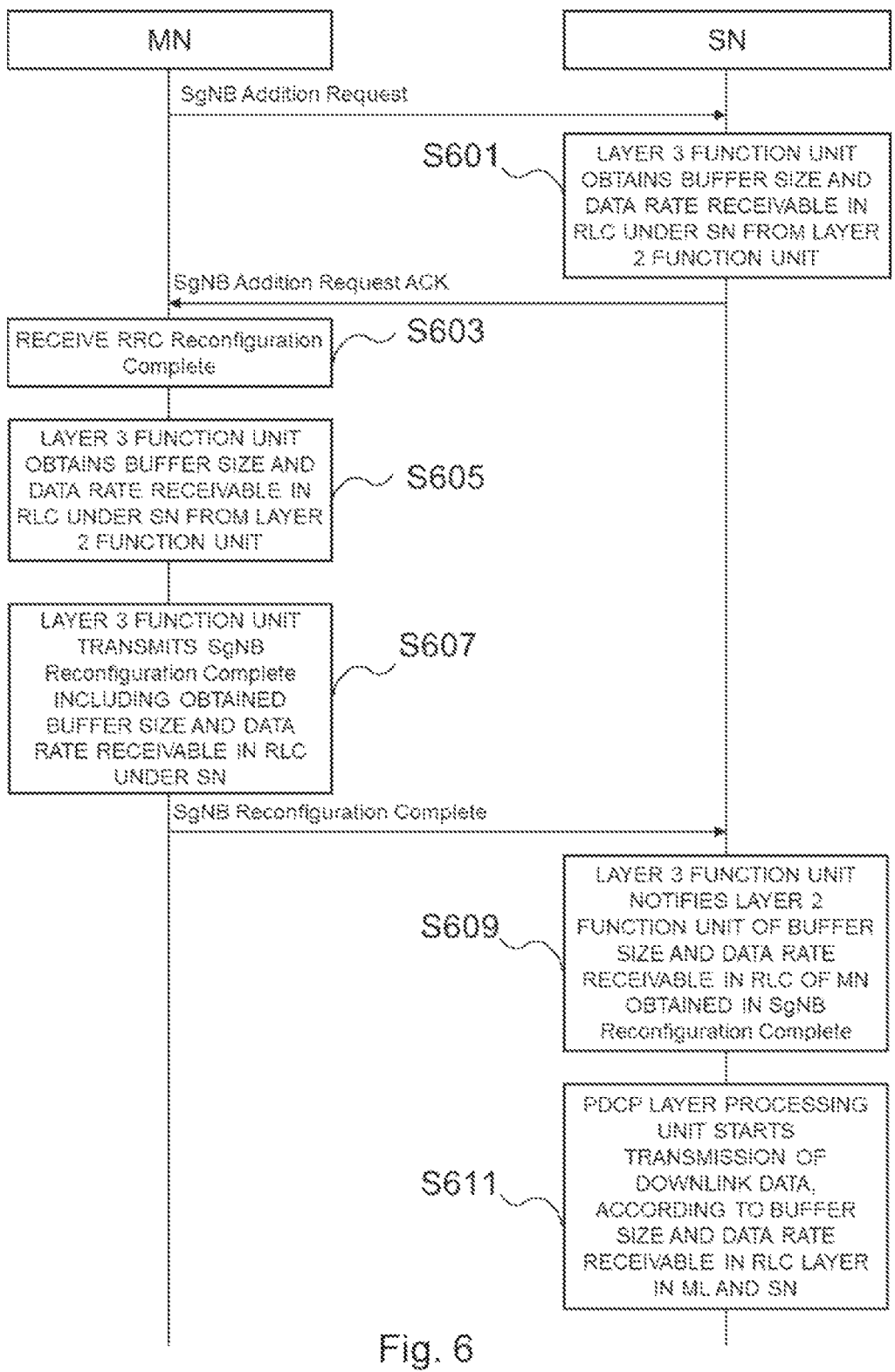
FIG. 6 is a sequence diagram illustrating a part of processing of the SgNB Addition Procedure in a first specific example.

In contrast, in the first specific example, as illustrated in FIG. 6, a part of processing of the SgNB Addition Procedure is performed. FIG. 6 is a sequence diagram illustrating a part of processing of the SgNB Addition Procedure in the first specific example.

First, after receiving an SgNB Addition Request from the base station 100 (MN) and before transmitting an SgNB Addition Request ACK to the base station 100 (MN), the layer 3 function unit 240*a* (information obtaining unit 241) of the base station 200 (SN) obtains information related to a buffer size and a data rate receivable in the RLC layer under the base station 200 (SN) from the layer 2 function unit 240*b* (RLC layer processing unit 247) (S601).

Next, after receiving the SgNB Addition Request ACK from the base station 200 (SN), the layer 3 function unit 140*a* of the base station 100 (MN) receives a message of RRC Reconfiguration Complete (S603). Next, the layer 3 function unit 140*a* (information obtaining unit 141) of the base station 100 (MN) obtains information related to a buffer size and a data rate receivable in the RLC layer under the base station 100 (MN) from the layer 2 function unit 140*b* (S605). Next, the layer 2 function unit 140*b* (communication processing unit 143) of the base station 100 (MN) transmits a message of SgNB Reconfiguration Complete including these pieced of obtained information to the base station 200 (SN) (S607).

Next, the layer 3 function unit 240*a* (communication processing unit 243) of the base station 200 (SN) notifies the layer 2 function unit 240*b* (PDCP layer processing unit 245) of the buffer size and the data rate receivable in the RLC layer of the base station 100 (MN) included in the message of SgNB Reconfiguration Complete (S609). Next, the PDCP layer processing unit 245 of the base station 200 (SN) starts transmission of downlink data to the terminal apparatus 300, according to the buffer size and the data rate receivable in the RLC layer in the base station 100 (ML) and the base station 200 (SN) (S611).

As described above, according to the processing illustrated in FIG. 6 described above, for example, in comparison to the reference example described above, transmission of downlink data can be started earlier and so that a data amount to the RLC layer is appropriate.

(3-2) Second Specific Example

In a second specific example, the first base station is a secondary node (for example, the base station 200) for dual connectivity for the terminal apparatus 300, and the second base station is a master node (for example, the base station 100) for dual connectivity for the terminal apparatus 300.

Figure 7:
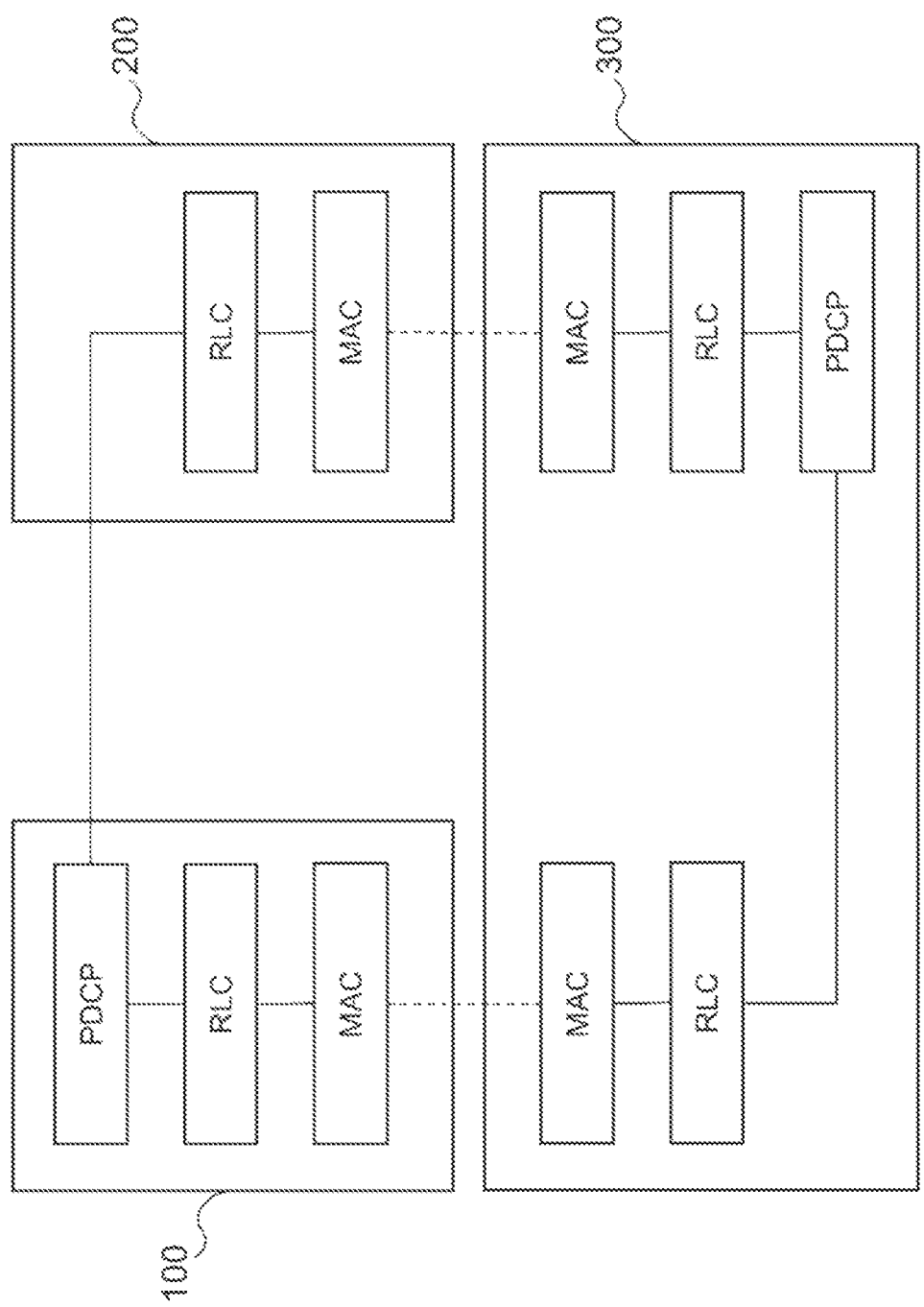
FIG. 7 is a diagram illustrating a schematic configuration of a downlink data flow in an MN Terminated Split Bearer.

In the second specific example, a Master Node (MN) Terminated Split Bearer for dual connectivity is configured. FIG. 7 is a diagram illustrating a schematic configuration of a downlink data flow in the MN Terminated Split Bearer.

As illustrated in FIG. 7, in the MN Terminated Split Bearer for dual connectivity, the terminal apparatus 300 performs communication simultaneously with the master node (base station 100) and the secondary node (base station 200). Specifically, the master node (PDCP layer processing unit 145 of the base station 100) performs PDCP layer processing, and distributes downlink data to the master node (RLC layer processing unit 147 of the base station 100) and the secondary node (RLC layer processing unit 147 of the base station 200).

The master node (PDCP layer processing unit 145 of the base station 100) receives a DL Data Delivery Status message from the secondary node (communication processing unit 243 of the base station 200), and can thereby check a load state of the RLC layer processing unit on the secondary side (RLC layer processing unit 247 of the base station 200). In other words, the master node (PDCP layer processing unit 145 of the base station 100) can refer¥ to a DL Data Delivery Status message from the secondary node (base station 200), to adjust a data amount to be distributed to each of the master node (RLC layer processing unit 147 of the base station 100) and the secondary node (RLC layer processing unit 247 of the base station 200).

Transmission Timing of DL Data Delivery Status Message

In the second specific example, the secondary node (communication processing unit 243 of the base station 200) transmits, to the master node (base station 100), a response message to a secondary node addition request message from the master node (base station 100) during the secondary node addition procedure for terminal apparatus 300. Here, the information for controlling the downlink data flow is included in the response message to the secondary node addition request message.

The secondary node addition procedure for the terminal apparatus 300 corresponds to, for example, an SgNB Addition Procedure for dual connectivity of Master Node (MN) Terminated Split Bearer Option of the LLS configuration. For example, in the sequence as illustrated in FIG. 5 described above, the secondary node addition request message corresponds to a message of SgNB Addition Request. For example, in the sequence as illustrated in FIG. 5, the response message to the secondary node addition request message corresponds to a message of SgNB Addition Request Acknowledge. The random access channel access is carried out in the Random Access Procedure that is performed after SgNB Addition Request Acknowledge.

Figure 8:
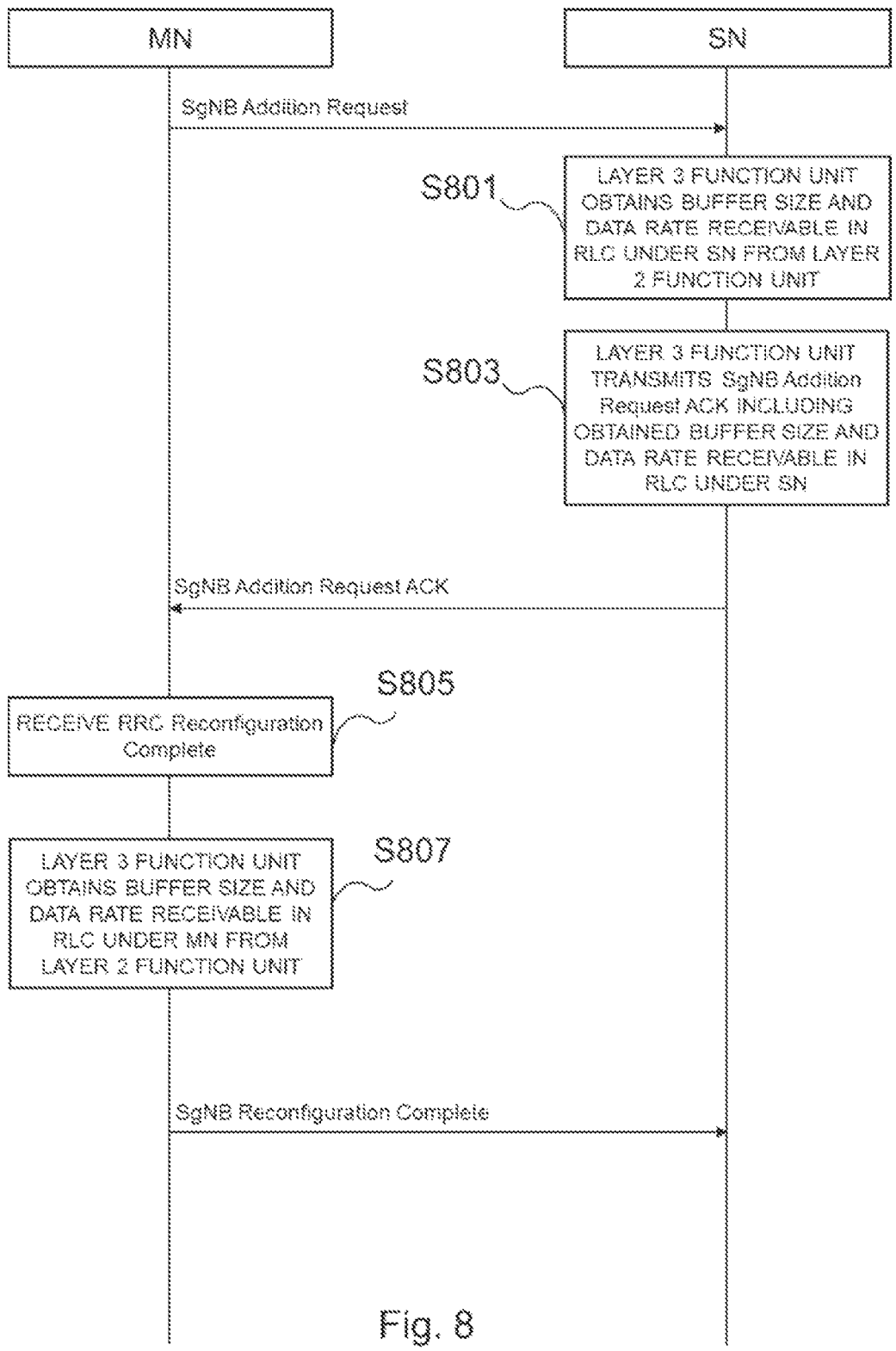
FIG. 8 is a sequence diagram illustrating a part of processing of the SgNB Addition Procedure in a second specific example.

FIG. 8 is a sequence diagram illustrating a part of processing of the SgNB Addition Procedure in the second specific example.

First, the layer 3 function unit 240a of the base station 200 (SN) determines whether MN terminated or SN terminated is to be configured, according to the SgNB Addition Request received from the base station 100 (MN). Here, when it is determined that MN terminated is to be configured, the layer 3 function unit 240a (information obtaining unit 241) of the base station 200 (SN) obtains information related to a buffer size and a data rate receivable in the RLC layer from the layer 2 function unit 240b (RLC layer processing unit 247) (S801).

Next, the layer 3 function unit 240a (communication processing unit 243) of the base station 200 (SN) transmits an SgNB Addition Request ACK including the obtained information to the base station 100 (MN) (S803).

Next, after receiving the SgNB Addition Request ACK from the base station 200 (SN), the layer 3 function unit 140a of the base station 100 (MN) receives a message of RRC Reconfiguration Complete (S805). Next, the layer 3 function unit 140a (information obtaining unit 141) of the base station 100 (MN) obtains information related to a buffer size and a data rate receivable in the RLC layer under the base station 100 (MN) from the layer 2 function unit 140b (S807). Subsequently, the base station 100 (MN) transmits a message of SgNB Reconfiguration Complete to the base station 200 (SN).

As described above, according to the processing illustrated in FIG. 8 described above, the information related to the buffer size and the data rate receivable in the RLC layer on the base station 200 side is added to the SgNB Addition Request ACK. Thus, after completion of the random access channel access between the base station 200 and the terminal apparatus 300, the base station 100 can start transmission of downlink data so that downlink data of the RLC layer is appropriately distributed to respective base stations 100 and 200.

<2.5. Example Alterations>

According to the first example embodiment, the specific examples described above are not restrictive, and for example, a High Layer Split (HLS) may be adopted, in which the secondary node is separated into units different from each other between the PDCP layer and the RLC layer.

(1) First Example Alteration

Figure 9:
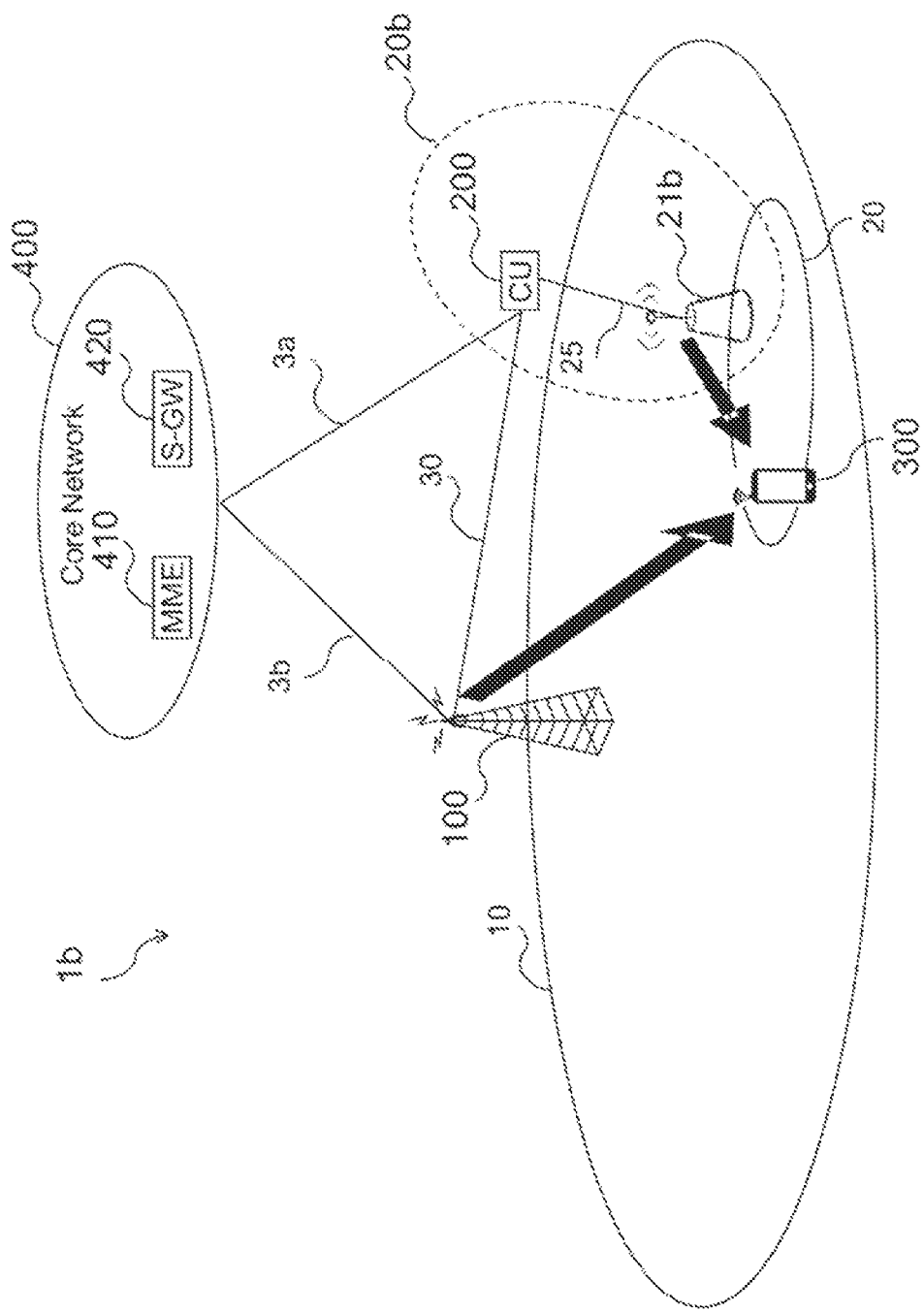
FIG. 9 is an explanatory diagram illustrating an example of a schematic configuration of a system 1b according to a first example alteration including a secondary node of a High Layer Split (HLS) configuration.

FIG. 9 is an explanatory diagram illustrating an example of a schematic configuration of a system 1b according to a first example alteration including the secondary node of the High Layer Split (HLS) configuration.

With reference to FIG. 9, in the system 1b according to the first example alteration, the base station 200 corresponds to a central unit included in a secondary node 20b of the High Layer Split (HLS) configuration. The base station 200 performs communication with a distributed unit 21b included in the secondary node 20b via an F1 Interface 25.

Figure 10:
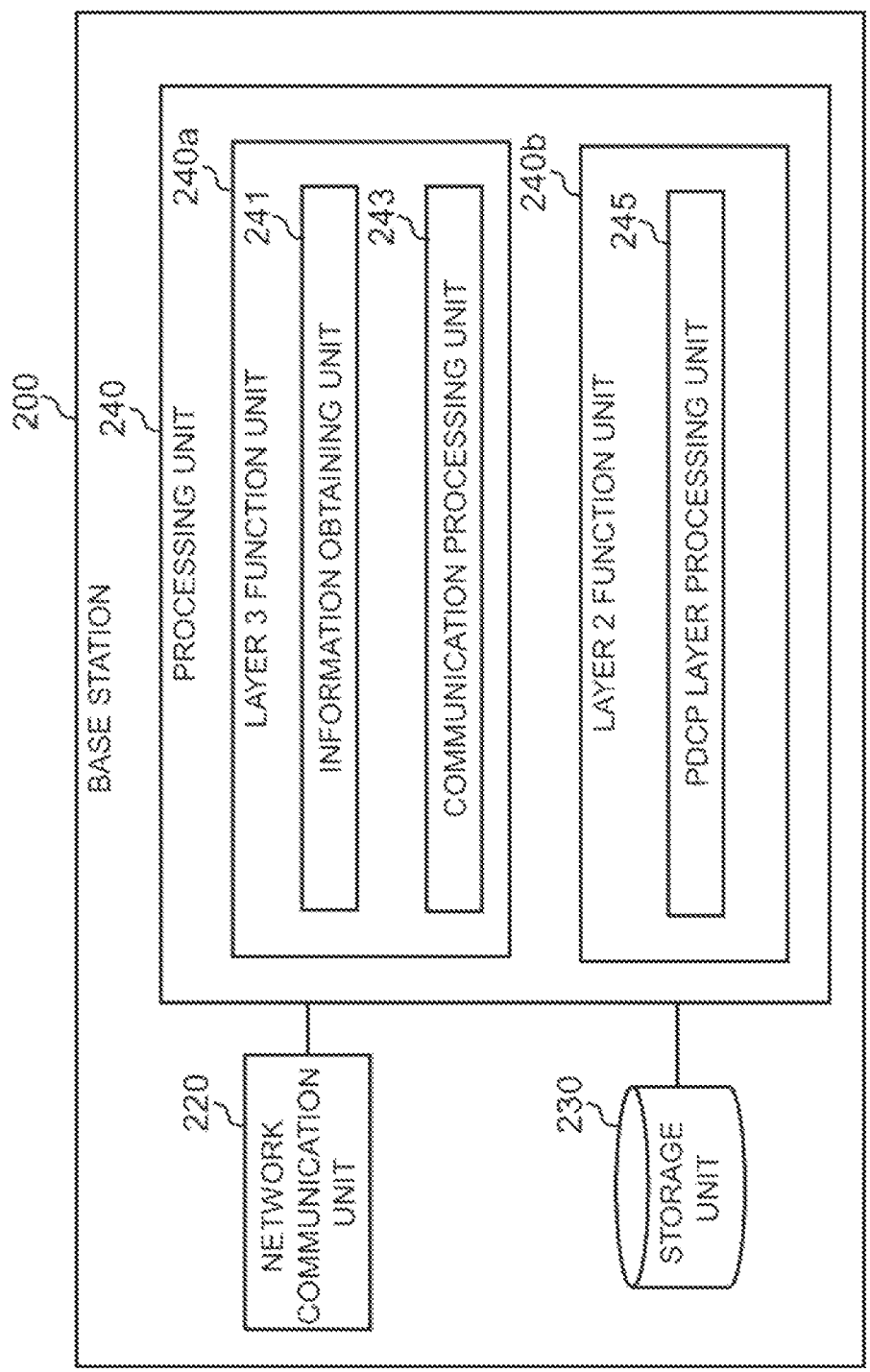
FIG. 10 is a block diagram illustrating an example of a schematic configuration of the base station 200 according to the first example alteration.

FIG. 10 is a block diagram illustrating an example of a schematic configuration of the base station 200 according to the first example alteration. The base station 200 according to the first example alteration is different from that in the example of the configuration illustrated in FIG. 3 described above mainly in that the base station 200 does not include the radio communication unit and also that the layer 2 function unit 240b does not include the RLC layer processing unit. Note that the configuration of the base station 100 according to the first example alteration is similar to the example of the configuration illustrated in FIG. 2 described above.

In the first example alteration, the first base station is a master node (base station 100) for dual connectivity for the terminal apparatus 300, and the second base station is a central unit (base station 200) included in the secondary node 20b for dual connectivity for the terminal apparatus 300. In the first example alteration, the Secondary Node (SN) Terminated Split Bearer for dual connectivity is configured.

In the first example alteration, the base station 100 (communication processing unit 143) transmits a secondary node reconfiguration complete message to the central unit (base station 200) included in the secondary node 20b during the secondary node addition procedure for the terminal apparatus 300. Here, the information for controlling the downlink data flow is included in the secondary node reconfiguration complete message.

The secondary node addition procedure for the terminal apparatus 300 corresponds to, for example, an SgNB Addition Procedure for dual connectivity of SN Terminated Split Bearer Option of the High Layer Split (HLS) configuration.

Figure 11:
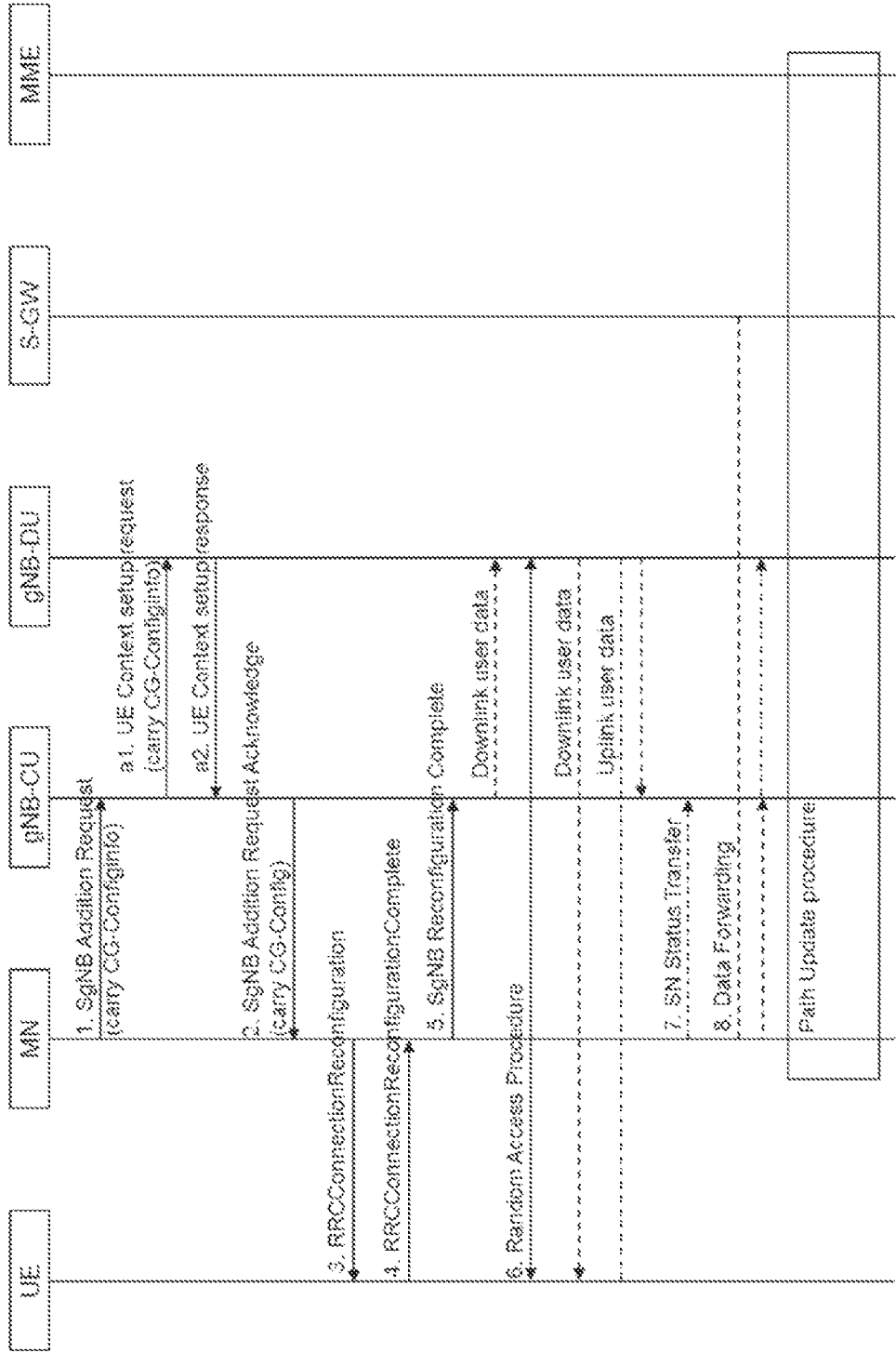
FIG. 11 is a sequence diagram illustrating an example of processing of the SgNB Addition Procedure in the HLS configuration.

FIG. 11 is a sequence diagram illustrating an example of processing of the SgNB Addition Procedure in the HLS configuration. With reference to FIG. 11, the "UE" corresponds to the terminal apparatus 300, an "MeNB" corresponds to the base station 100, a "gNB-CU" corresponds to the base station 200, a "gNB-DU" corresponds to the distributed unit 21b, and the "S-GW" and "MME" each correspond to a network node in the core network 400. The secondary node reconfiguration complete message corresponds to a message of SgNB Reconfiguration Complete. The random access channel access is carried out in the Random Access Procedure that is performed after SgNB Reconfiguration Complete.

In the sequence as illustrated in FIG. 11, the base station 100 (communication processing unit 143) transmits a secondary node reconfiguration complete message to the base station 200 during the secondary node addition procedure for the terminal apparatus 300. Here, the information for controlling the downlink data flow is included in the secondary node reconfiguration complete message.

Figure 12:
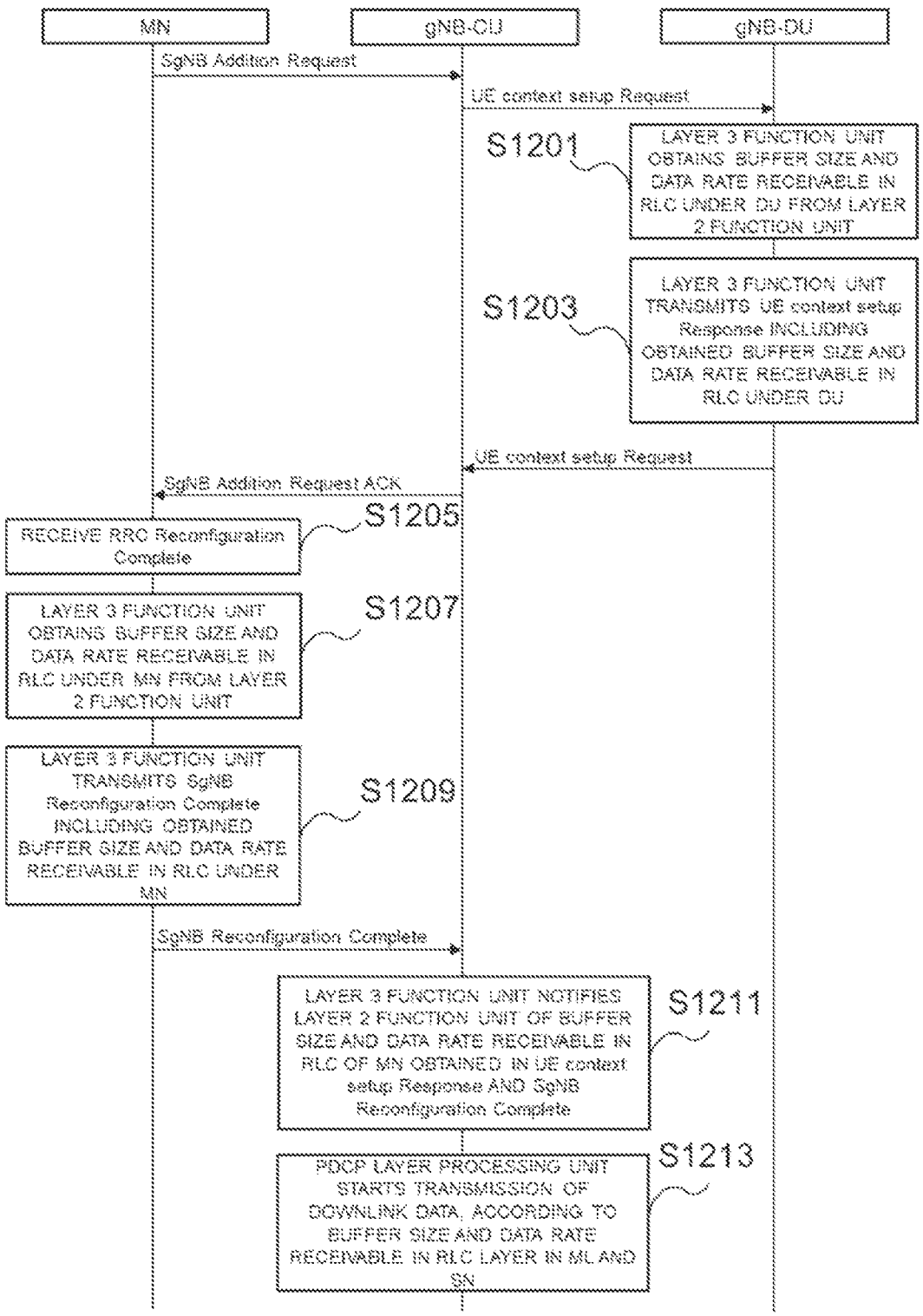
FIG. 12 is a sequence diagram illustrating a part of processing of the SgNB Addition Procedure in SN Terminated Split Bearer option.

FIG. 12 is a sequence diagram illustrating a part of processing of the SgNB Addition Procedure in SN Terminated Split Bearer option.

First, the layer 3 function unit of the distributed unit 21*b* (gNB-DU) receives a message of UE context setup Request from the base station 200 (gNB-CU) in response to a message of SgNB Addition Request from the base station 100, and then the layer 3 function unit obtains a buffer size and a data rate receivable in the RLC layer under the distributed unit 21*b* (gNB-DU) from the layer 2 function unit of the distributed unit 21*b* (gNB-DU) (S1201).

Next, the layer 3 function unit of the distributed unit 21*b* (gNB-DU) transmits a message of UE context setup Response including the obtained information to the base station 200 (gNB-CU) (S1203).

Next, the base station 100 (MN) receives a message of SgNB Addition Request ACK from the base station 200 (gNB-CU) in response to the message of UE context setup Request, and then the base station 100 (MN) receives a message of RRC Reconfiguration Complete (S1205). The layer 3 function unit 140*a* (information obtaining unit 141) of the base station 100 (MN) obtains information related to a buffer size and a data rate receivable in the RLC layer under the base station 100 (MN) from the layer 2 function unit 140*b* (RLC layer processing unit 147) (S1207). Next, the layer 3 function unit 140*a* (communication processing unit 143) of the base station 100 (MN) transmits a message of SgNB Reconfiguration Complete including the information to the gNB-CU (base station 200) (S1209).

Next, the layer 3 function unit 240*a* (communication processing unit 243) of the base station 200 (gNB-CU) notifies the layer 2 function unit 240*b* (PDCP layer processing unit 245) of the buffer size and the data rate receivable in the RLC layer of the base station 100 (MN) obtained in the message of SgNB Reconfiguration Complete (S1211). Next, the PDCP layer processing unit 245 of the base station 200 (gNB-CU) starts transmission of downlink data to the terminal apparatus 300, according to the buffer size and the data rate receivable in the RLC layer in the base station 100 (ML) and the base station 200 (gNB-CU) (S1213).

According to the processing illustrated in FIG. 12 described above, transmission of downlink data can be started earlier and so that a data amount to the RLC layer is appropriate.

(2) Second Example Alteration

Figure 13:
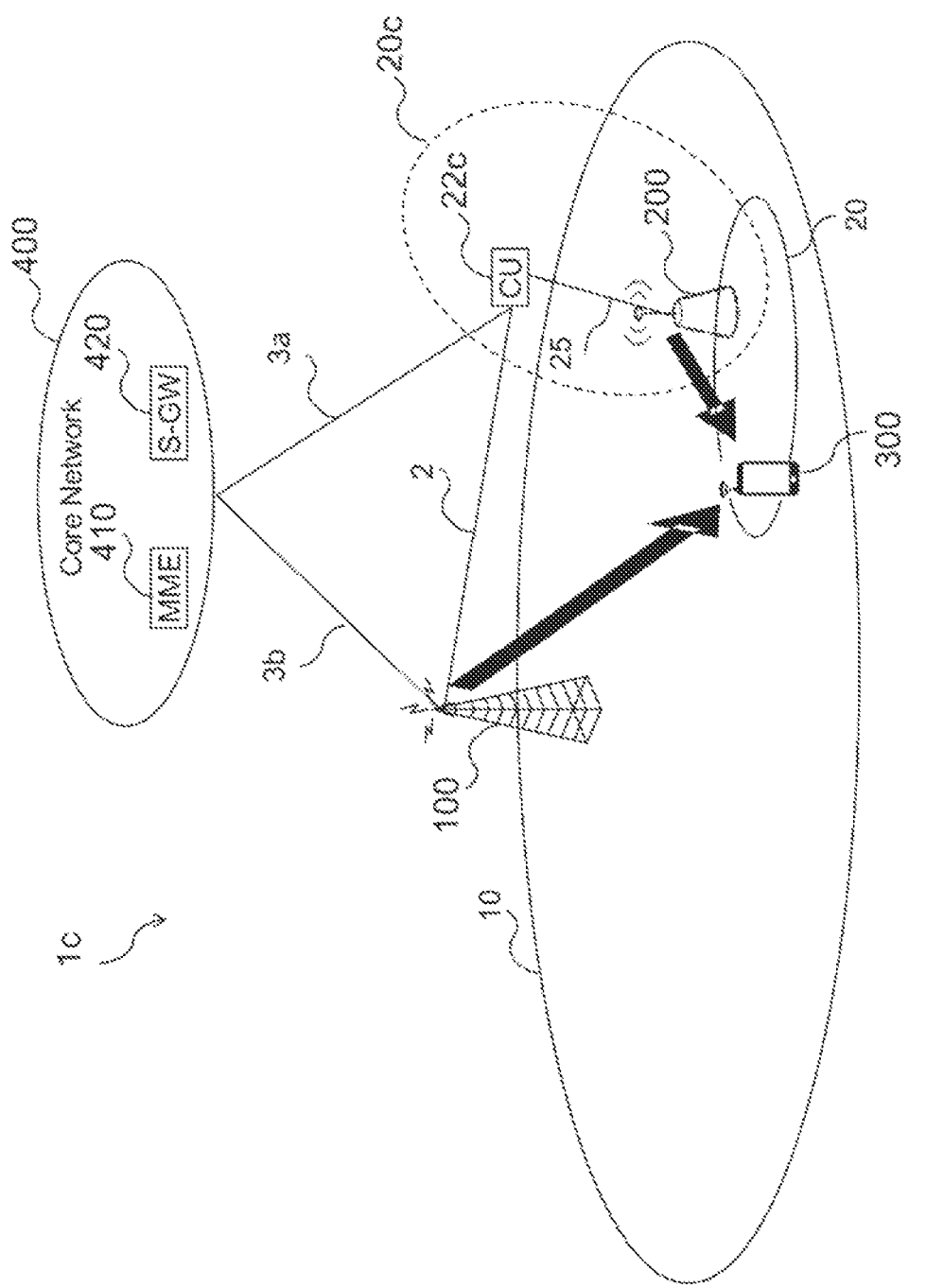
FIG. 13 is an explanatory diagram illustrating an example of a schematic configuration of a system 1c according to the first example alteration including the secondary node of the HLS configuration.

FIG. 13 is an explanatory diagram illustrating an example of a schematic configuration of a system 1*c* according to a second example alteration including the secondary node of the HLS configuration.

With reference to FIG. 13, in the system 1*c* according to the second example alteration, the base station 200 corresponds to a distributed unit included in a secondary node 20*c* of the High Layer Split (HLS) configuration. The base station 200 performs communication with a central unit 22*c* included in the secondary node 20*c* via the F1 Interface 25.

Figure 14:
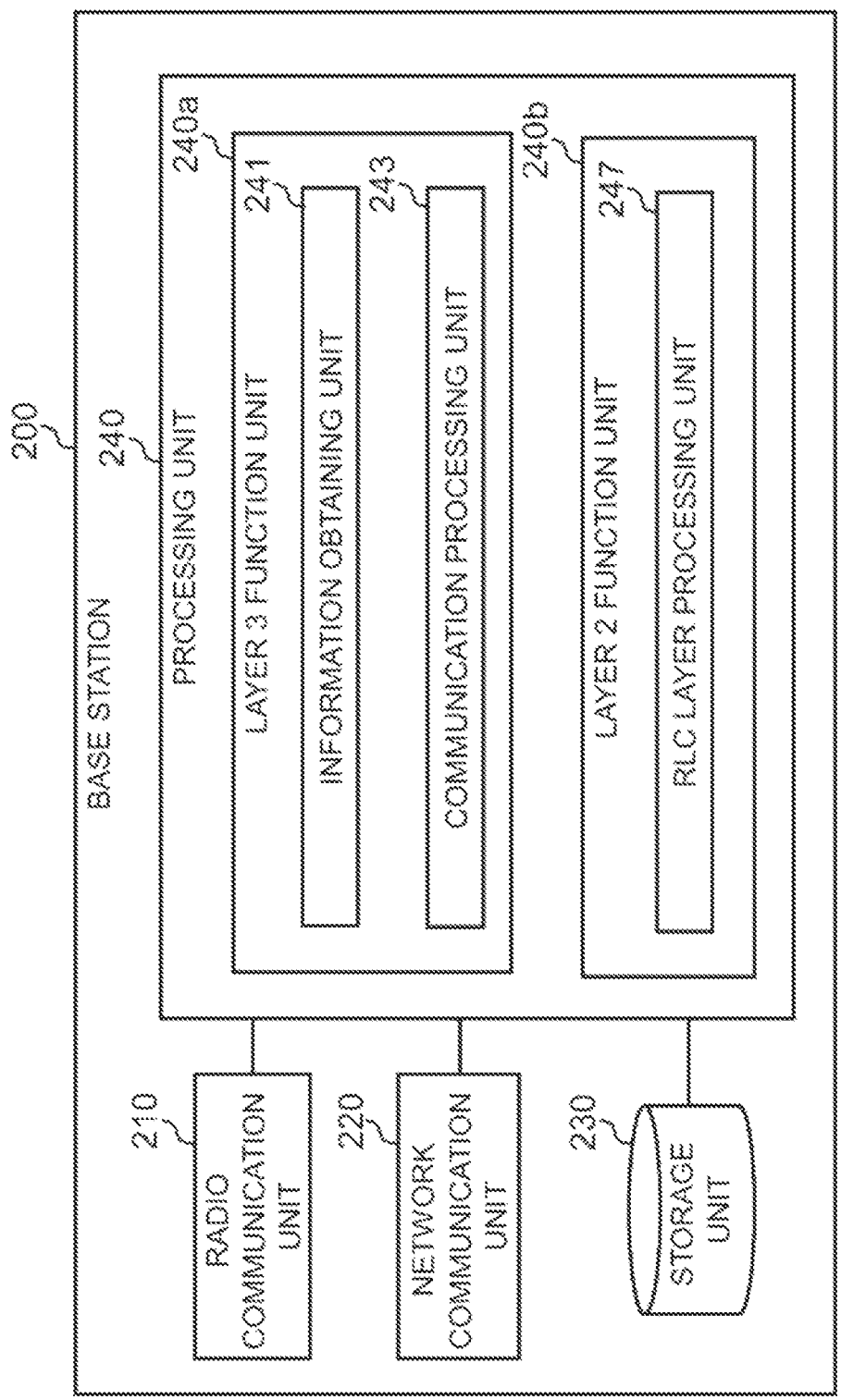
FIG. 14 is a block diagram illustrating an example of a schematic configuration of the base station 200 according to a second example alteration.

FIG. 14 is a block diagram illustrating an example of a schematic configuration of the base station 200 according to the second example alteration. The base station 200 according to the second example alteration is different from that in the example of the configuration illustrated in FIG. 3 described above mainly in that the layer 2 function unit 240*b* does not include the PDCP layer processing unit. Note that the configuration of the base station 100 according to the second example alteration is similar to the example of the configuration illustrated in FIG. 2 described above.

In the second example alteration, the first base station is a distributed unit (base station 200) included in the secondary node for dual connectivity for the terminal apparatus 300, and the second base station is a master node (base station 100) for dual connectivity for the terminal apparatus 300. In other words, in the second example alteration, the MN Terminated Split Bearer for dual connectivity is configured.

In the second example alteration, the base station 200 (communication processing unit 243) transmits, to the base station 100, a response message to the secondary node addition request message from the base station 100 via the central unit 22*c* included in the secondary node 20*c*, during the secondary node addition procedure for the terminal apparatus 300. Here, the information for controlling the downlink data flow is included in the response message to the secondary node addition request message.

The secondary node addition procedure for the terminal apparatus 300 corresponds to, for example, an SgNB Addition Procedure for dual connectivity of MN Terminated Split Bearer Option of the HLS configuration. For example, in the sequence illustrated in FIG. 11, the secondary node addition request message corresponds to a message of SgNB Addition Request. For example, in the sequence as illustrated in FIG. 11, the response message to the secondary node addition request message corresponds to a message of UE context setup Request. The random access channel access is carried out in the Random Access Procedure that is performed after UE context setup Request.

Figure 15:
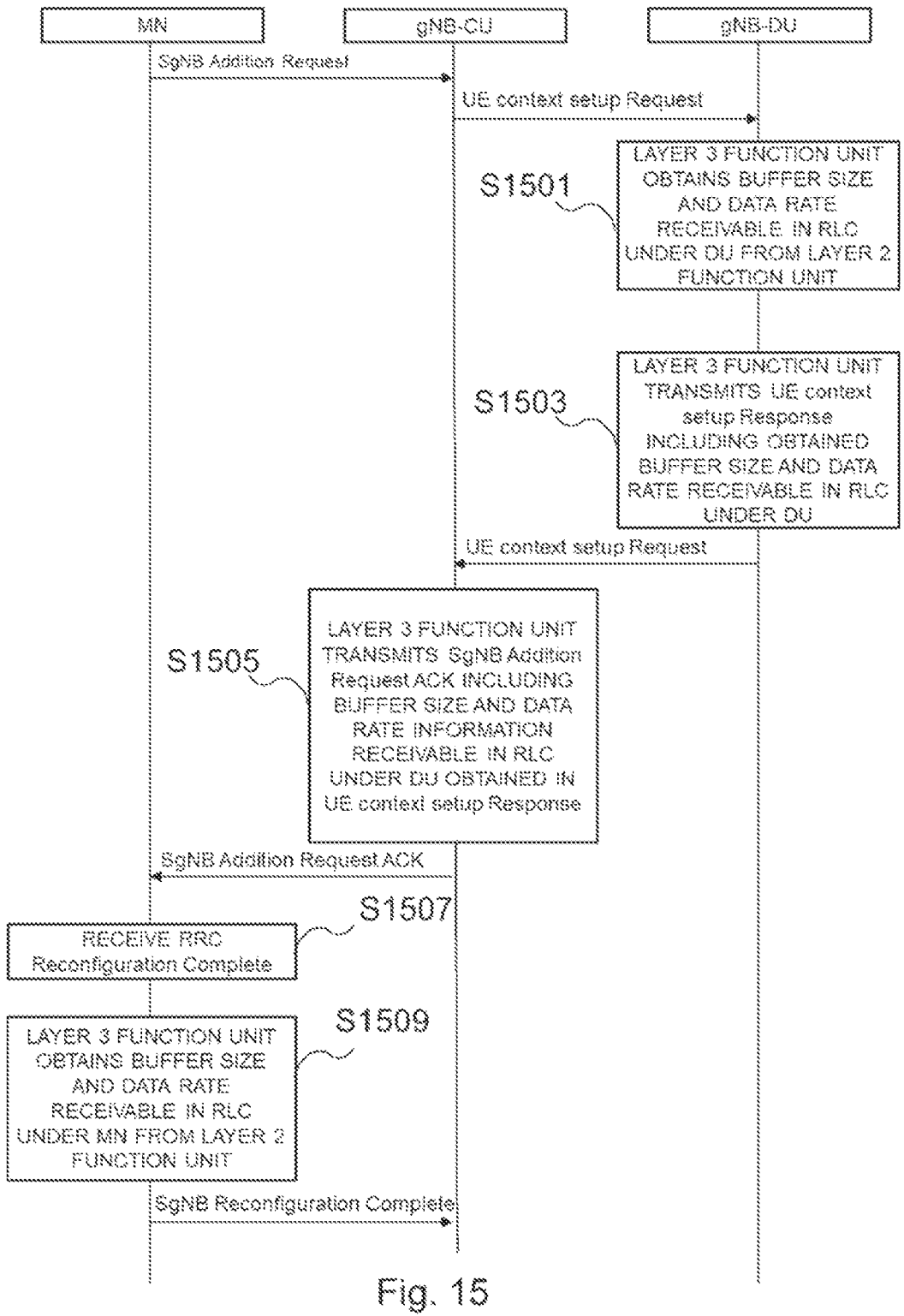
FIG. 15 is a sequence diagram illustrating a part of processing of the SgNB Addition Procedure in the second example alteration.

FIG. 15 is a sequence diagram illustrating a part of processing of the SgNB Addition Procedure in the second example alteration.

First, the layer 3 function unit 240*a* (information obtaining unit 241) of the base station 200 (gNB-DU) receives a message of UE context setup Request from the central unit 22*c* (gNB-CU) in response to a message of SgNB Addition Request from the base station 100, and then the layer 3 function unit 240*a* obtains information related to obtaining of a buffer size and a data rate receivable in the RLC layer under the base station 200 (gNB-DU) from the layer 2 function unit 240*b* (RLC layer processing unit 247) (S1501).

Next, the layer 3 function unit 240*a* (communication processing unit 243) of the base station 200 (gNB-DU) transmits a message of SgNB Addition Request ACK including the obtained information to the central unit 22*c* (gNB-CU) (S1503).

Next, the layer 3 function unit of the central unit 22*c* (gNB-CU) transmits, to the base station 100 (MN), a message of SgNB Addition Request ACK including the buffer size and data rate information receivable in the RLC layer under the base station 200 (gNB-DU) obtained in the message of UE context setup Response (S1505).

Next, after receiving the message of SgNB Addition Request ACK from the central unit 22*c* (gNB-CU), the base station 100 (MN) receives a message of RRC Reconfiguration Complete (S1507). Next, the layer 3 function unit 140*a* (information obtaining unit 141) of the base station 100 (MN) obtains information related to a buffer size and a data rate receivable in the RLC layer under the base station 100 from the layer 2 function unit 140*b* (RLC layer processing unit 147) (S1509). Next, the base station 100 (MN) transmits a message of SgNB Reconfiguration Complete to the central unit 22c of the secondary node 20c.

As described above, according to the processing illustrated in FIG. 15 described above, the information related to obtaining of the buffer size and the data rate receivable in the RLC layer of the distributed unit (base station 200) included in the secondary node 20c is added to the message of UE context setup Response. Thus, immediately after completion of the random access channel access between the secondary node 20c and the terminal apparatus 300, the layer 3 function unit 140b (PDCP layer processing unit 145) of the base station 100 can perform transmission of downlink data.

3. Second Example Embodiment

Next, with reference to FIG. 16, a second example embodiment of the present invention will be described. The above-described first example embodiment is a concrete example embodiment, whereas the second example embodiment is a more generalized example embodiment.

<3.1. Configuration of System 2>

Figure 16:
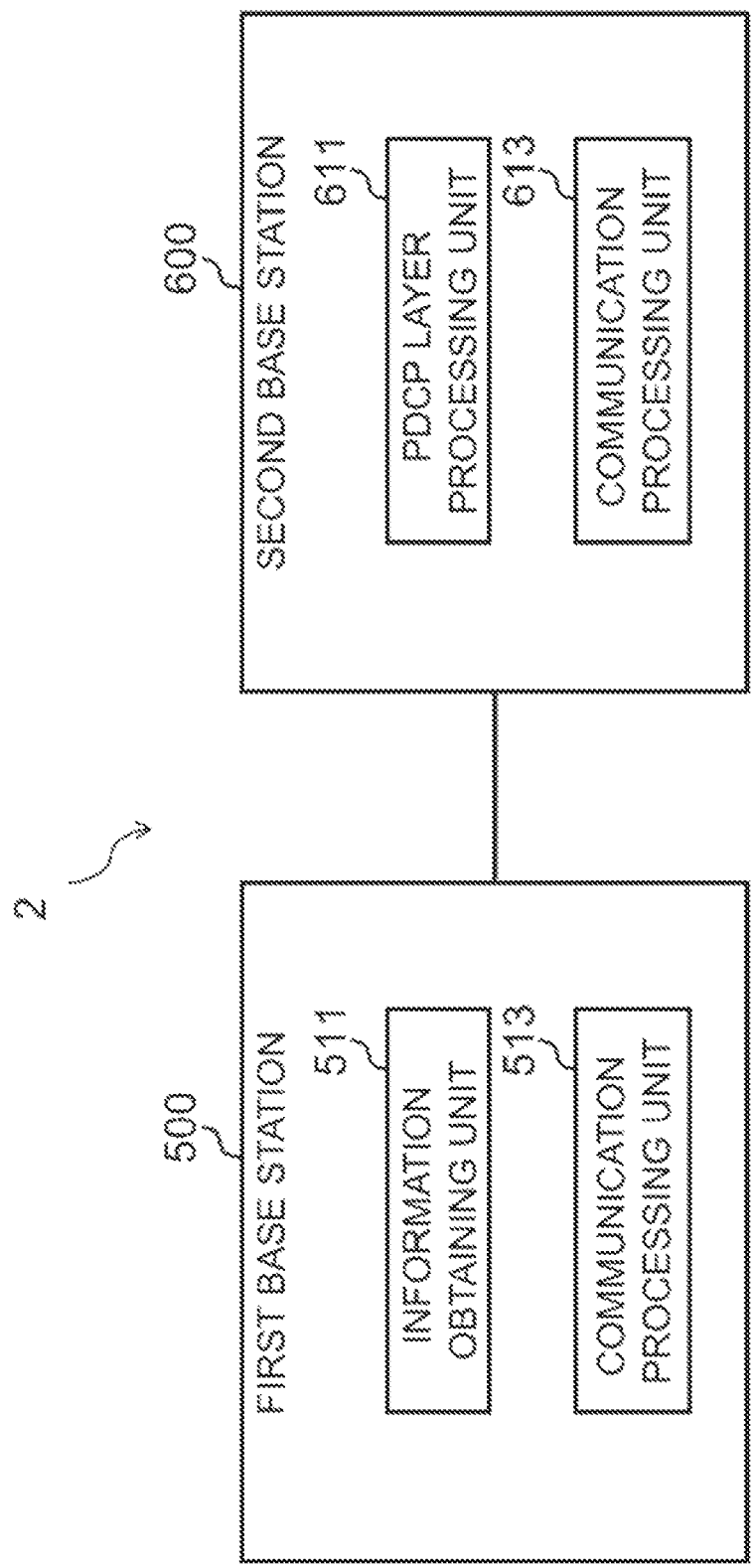
FIG. 16 is an explanatory diagram illustrating an example of a schematic configuration of a system 2 according to the second example embodiment.

With reference to FIG. 16, an example of a configuration of a system 2 according to the second example embodiment will be described.

FIG. 16 is an explanatory diagram illustrating an example of a schematic configuration of the system 2 according to the second example embodiment. With reference to FIG. 16, the system 2 includes a first base station 500 and a second base station 600.

<3.2. Configuration of First Base Station 500>

With reference to FIG. 16, the first base station 500 includes an information obtaining unit 511 and a communication processing unit 513. Specific operations of the information obtaining unit 511 and the communication processing unit 513 will be described later.

The information obtaining unit 511 and the communication processing unit 513 may be implemented with one or more processors, such as a baseband (BB) processor and/or a different kind of processor, a memory (e.g., a nonvolatile memory and/or a volatile memory), and/or a hard disk. The information obtaining unit 511 and the communication processing unit 513 may be implemented with the same processor or may be implemented with separate processors. The memory may be included in the one or more processors or may be provided outside the one or more processors.

The first base station 500 may include a memory configured to store a program (instructions) and one or more processors that can execute the program (instructions). The one or more processors may execute the program and thereby perform operations of the information obtaining unit 511 and the communication processing unit 513. The program may be a program for causing the processor(s) to execute the operations of the information obtaining unit 511 and the communication processing unit 513.

Note that the first base station 500 may be virtual. In other words, the first base station 500 may be implemented as a virtual machine. In this case, the first base station 500 (the virtual machine) may operate as a physical machine (hardware) including a processor, a memory, and the like, and a virtual machine on a hypervisor.

<3.3. Configuration of Second Base Station 600>

With reference to FIG. 16, the second base station 600 includes a PDCP layer processing unit 611 and a communication processing unit 613. Specific operations of the PDCP layer processing unit 611 and the communication processing unit 613 will be described later.

The PDCP layer processing unit 611 and the communication processing unit 613 may be implemented with one or more processors, such as a baseband (BB) processor and/or a different kind of processor, a memory (e.g., a nonvolatile memory and/or a volatile memory), and/or a hard disk. The PDCP layer processing unit 611 and the communication processing unit 613 may be implemented with the same processor or may be implemented with separate processors. The memory may be included in the one or more processors or may be provided outside the one or more processors.

The second base station 600 may include a memory configured to store a program (instructions) and one or more processors that can execute the program (instructions). The one or more processors may execute the program and thereby perform operations of the PDCP layer processing unit 611 and the communication processing unit 613. The program may be a program for causing the processor(s) to execute the operations of the PDCP layer processing unit 611 and the communication processing unit 613.

Note that the second base station 600 may be virtual. In other words, the second base station 600 may be implemented as a virtual machine. In this case, the second base station 600 (the virtual machine) may operate as a physical machine (hardware) including a processor, a memory, and the like, and a virtual machine on a hypervisor.

<3.4. Technical Features>

Technical features of the second example embodiment will be described.

According to the second example embodiment, the first base station 500 (information obtaining unit 511) obtains information for controlling a downlink data flow in an RLC layer for a terminal apparatus. The first base station 500 (communication processing unit 513) transmits, to the second base station 600 performing processing for a PDCP layer for the terminal apparatus, the information for controlling the downlink data flow, before the first base station 500 detects a correct random access channel access.

The second base station 600 (PDCP layer processing unit 611) executes processing for the PDCP layer. The second base station 600 (communication processing unit 613) receives the information for controlling the downlink data flow in the RLC from the first base station 500 performing processing in the RLC layer for the terminal apparatus, before the first base station 500 detects a correct random access channel access.

Relationship with First Example Embodiment

As an example, the first base station 500 and the second base station 600 according to the second example embodiment are the base station 100 and the base station 200 according to the first example embodiment, respectively. In this case, the descriptions of the first example embodiment may be applicable to the second example embodiment as well.

Note that the second example embodiment is not limited to this example.

The second example embodiment has been described above. According to the second example embodiment, transmission of downlink data to the RLC layer can be started with an appropriate data amount from the second base station 600 performing PDCP layer processing to the first base station 500 performing RLC layer processing.

4. Other Example Embodiments

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

For example, the steps in the processing described in the Specification may not necessarily be executed in time series in the order described in the corresponding sequence diagram. For example, the steps in the processing may be executed in an order different from that described in the corresponding sequence diagram or may be executed in parallel. Some of the steps in the processing may be deleted, or more steps may be added to the processing.

An apparatus including constituent elements (for example, the information obtaining unit, the communication processing unit, the PDCP layer processing unit, and/or the RLC layer processing unit) of the base station described in the Specification (for example, one or more apparatuses (or units) among a plurality of apparatuses (or units) constituting the base station, or a module for one of the plurality of apparatuses (or units)) may be provided. Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present invention.

The whole or part of the example embodiments disclosed above can be described as, but not limited to, the following supplementary notes.

(Supplementary Note 1)

A first base station comprising:

an information obtaining unit configured to obtain information for controlling a downlink data flow in a Radio Link Control (RLC) layer for a terminal apparatus; and a communication processing unit configured to transmit, to a second base station performing processing for a Packet Data Convergence Protocol (PDCP) layer for the terminal apparatus, the information for controlling the downlink data flow, before the first base station detects a correct random access channel access.

(Supplementary Note 2)

The first base station according to supplementary note 1, wherein the information for controlling the downlink data flow includes information related to a buffer size for downlink data in the RLC layer.

(Supplementary Note 3)

The first base station according to supplementary note 1 or 2, wherein the information for controlling the downlink data flow includes information related to a data rate for downlink data in the RLC layer.

(Supplementary Note 4)

The first base station according to any one of supplementary notes 1 to 3, wherein the random access channel access is performed by the terminal apparatus for a bearer for the second base station.

(Supplementary Note 5)

The first base station according to any one of supplementary notes 1 to 4, wherein the first base station is a master node for dual connectivity for the terminal apparatus, and the second base station is a secondary node for the dual connectivity for the terminal apparatus.

(Supplementary Note 6)

The first base station according to supplementary note 5, wherein the communication processing unit is configured to transmit, to the second base station, a Secondary Node Reconfiguration Complete message during a Secondary Node Addition procedure for the terminal apparatus, and the information for controlling the downlink data flow is included in the Secondary Node Reconfiguration Complete message.

(Supplementary Note 7)

The first base station according to any one of supplementary notes 1 to 4, wherein the first base station is a secondary node for dual connectivity for the terminal apparatus, and the second base station is a master node for the dual connectivity for the terminal apparatus.

(Supplementary Note 8)

The first base station according to supplementary note 7, wherein the communication processing unit is configured to transmit, to the second base station, a response message to a Secondary Node Addition Request message from the second base station during a secondary node addition procedure for the terminal apparatus, and the information for controlling the downlink data flow is included in the response message to the Secondary Node Addition Request message.

(Supplementary Note 9)

The first base station according to any one of supplementary notes 1 to 4, wherein the first base station is a master node for dual connectivity for the terminal apparatus, and the second base station is a central unit included in a secondary node for the dual connectivity for the terminal apparatus.

(Supplementary Note 10)

The first base station according to supplementary note 9, wherein the communication processing unit is configured to transmit, to the second base station, a Secondary Node Reconfiguration Complete message during a Secondary Node Addition procedure for the terminal apparatus, and the information for controlling the downlink data flow is included in the Secondary Node Reconfiguration Complete message.

(Supplementary Note 11)

The first base station according to any one of supplementary notes 1 to 4, wherein the first base station is a distributed unit included in a secondary node for dual connectivity for the terminal apparatus, and the second base station is a master node for the dual connectivity for the terminal apparatus.

(Supplementary Note 12)

The first base station according to supplementary note 11, wherein the communication processing unit is configured to transmit, to the second base station, a response message to a Secondary Node Addition Request message from the second base station via a central unit included in the secondary node, during a secondary node addition procedure for the terminal apparatus, and the information for controlling the downlink data flow is included in the response message to the Secondary Node Addition Request message.

(Supplementary Note 13)

A second base station comprising:

an execution unit configured to execute processing for a Packet Data Convergence Protocol (PDCP) layer; and a communication processing unit configured to receive, from a first base station performing processing in a Radio Link Control (RLC) layer for the terminal apparatus, information for controlling a downlink data flow in the RLC, before the first base station detects a correct random access channel access.

(Supplementary Note 14)

A method comprising:

obtaining information for controlling a downlink data flow in a Radio Link Control (RLC) layer for a terminal apparatus; and transmitting the information for controlling the downlink data flow to a second base station performing processing for a Packet Data Convergence Protocol (PDCP) layer for the terminal apparatus, before the first base station detects a correct random access channel access.

(Supplementary Note 15)

A method comprising:

executing processing for a Packet Data Convergence Protocol (PDCP) layer; and receiving, from a first base station performing processing in a Radio Link Control (RLC) layer for the terminal apparatus, information for controlling a downlink data flow in the RLC, before the first base station detects a correct random access channel access.

(Supplementary Note 16)

A program that causes a processor to execute:

obtaining information for controlling a downlink data flow in a Radio Link Control (RLC) layer for a terminal apparatus; and transmitting the information for controlling the downlink data flow to a second base station performing processing for a Packet Data Convergence Protocol (PDCP) layer for the terminal apparatus, before the first base station detects a correct random access channel access.

(Supplementary Note 17)

A program that causes a processor to execute:

executing processing for a Packet Data Convergence Protocol (PDCP) layer; and receiving, from a first base station performing processing in a Radio Link Control (RLC) layer for the terminal apparatus, information for controlling a downlink data flow in the RLC, before the first base station detects a correct random access channel access.

(Supplementary Note 18)

A non-transitory computer readable recording medium storing a program that causes a processor to execute:

obtaining information for controlling a downlink data flow in a Radio Link Control (RLC) layer for a terminal apparatus; and transmitting the information for controlling the downlink data flow to a second base station performing processing for a Packet Data Convergence Protocol (PDCP) layer for the terminal apparatus, before the first base station detects a correct random access channel access.

(Supplementary Note 19)

A non-transitory computer readable recording medium storing a program that causes a processor to execute:

executing processing for a Packet Data Convergence Protocol (PDCP) layer; and receiving, from a first base station performing processing in a Radio Link Control (RLC) layer for the terminal apparatus, information for controlling a downlink data flow in the RLC, before the first base station detects a correct random access channel access.

This application claims priority based on JP 2019-146620 filed on Aug. 8, 2019, the entire disclosure of which is incorporated herein.

INDUSTRIAL APPLICABILITY

In a mobile communication system, transmission of downlink data can be started with an appropriate data amount from a base station that performs PDCP layer processing to another base station that performs RLC layer processing.

REFERENCE SIGNS LIST 1a, 1b, 1c, 2 System
100, 200 Base Station
141, 241, 511 Information Obtaining Unit
143, 243, 513, 613 Communication Processing Unit
145, 245, 611 PDCP Layer Processing Unit
147, 247 RLC Layer Processing Unit
300 Terminal Apparatus
500 First Base Station
600 Second Base Station

What is claimed is:

1. A first base station comprising:
a memory storing instructions; and
one or more processors configured to execute the instructions to:
an information obtaining unit configured to obtain information for controlling a downlink data flow in a Radio Link Control (RLC) layer for a terminal apparatus;
a communication processing unit configured to transmit, to a second base station performing processing for a Packet Data Convergence Protocol (PDCP) layer for the terminal apparatus, the information for controlling the downlink data flow, before a connection between the first base station and the terminal apparatus is performed; and
coordinate processing of obtaining the information and processing of transmitting the information, with the second base station.

2. The first base station according to claim 1, wherein the information for controlling the downlink data flow includes information related to a buffer size for downlink data in the RLC layer.

3. The first base station according to claim 1, wherein the information for controlling the downlink data flow includes information related to a data rate for downlink data in the RLC layer.

4. The first base station according to claim 1, wherein the random access channel access is performed by the terminal apparatus for a bearer for the second base station.

5. The first base station according to claim 1, wherein the first base station is a master node for dual connectivity for the terminal apparatus, and
the second base station is a secondary node for the dual connectivity for the terminal apparatus.

6. The first base station according to claim 5, wherein the one or more processors are configured to execute the instructions to transmit, to the second base station, a Secondary Node Reconfiguration Complete message during a Secondary Node Addition procedure for the terminal apparatus, and the information for controlling the downlink data flow is included in the Secondary Node Reconfiguration Complete message.

7. The first base station according to claim 1, wherein
the first base station is a secondary node for dual connectivity for the terminal apparatus, and
the second base station is a master node for the dual connectivity for the terminal apparatus.

8. The first base station according to claim 7, wherein
the one or more processors are configured to execute the instructions to transmit, to the second base station, a response message to a Secondary Node Addition Request message from the second base station during a secondary node addition procedure for the terminal apparatus, and
the information for controlling the downlink data flow is included in the response message to the Secondary Node Addition Request message.

9. The first base station according to claim 1, wherein
the first base station is a master node for dual connectivity for the terminal apparatus, and
the second base station is a central unit included in a secondary node for the dual connectivity for the terminal apparatus.

10. The first base station according to claim 9, wherein
the one or more processors are configured to execute the instructions to transmit, to the second base station, a Secondary Node Reconfiguration Complete message during a Secondary Node Addition procedure for the terminal apparatus, and
the information for controlling the downlink data flow is included in the Secondary Node Reconfiguration Complete message.

11. The first base station according to claim 1, wherein
the first base station is a distributed unit included in a secondary node for dual connectivity for the terminal apparatus, and
the second base station is a master node for the dual connectivity for the terminal apparatus.

12. The first base station according to claim 11, wherein
the one or more processors are configured to execute the instructions to transmit, to the second base station, a response message to a Secondary Node Addition Request message from the second base station via a central unit included in the secondary node, during a secondary node addition procedure for the terminal apparatus, and
the information for controlling the downlink data flow is included in the response message to the Secondary Node Addition Request message.

13. A second base station comprising:
a memory storing instructions; and
one or more processors configured to execute the instructions to:
   execute processing for a Packet Data Convergence Protocol (PDCP) layer;
   receive, from a first base station performing processing in a Radio Link Control (RLC) layer for the terminal apparatus, information for controlling a downlink data flow in the RLC, before a connection between the first base station detects and the terminal apparatus is performed; and
   coordinate the processing for the PDCP layer and processing of receiving the information, with the first base station.

14. A method comprising:
obtaining information for controlling a downlink data flow in a Radio Link Control (RLC) layer for a terminal apparatus; and
transmitting the information for controlling the downlink data flow to a second base station performing processing for a Packet Data Convergence Protocol (PDCP) layer for the terminal apparatus, before a connection between the first base station and the terminal apparatus is performed; and
coordinating processing of obtaining the information and processing of transmitting the information, with the second base station.

* * * * *